US009276650B2

(12) United States Patent
Kishigami et al.

(10) Patent No.: US 9,276,650 B2
(45) Date of Patent: Mar. 1, 2016

(54) WIRELESS COMMUNICATION APPARATUS AND RESPONSE CONTROL METHOD

(75) Inventors: Takaaki Kishigami, Tokyo (JP); Isamu Yoshii, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 1039 days.

(21) Appl. No.: 13/390,359

(22) PCT Filed: Aug. 27, 2010

(86) PCT No.: PCT/JP2010/005300
§ 371 (c)(1),
(2), (4) Date: Feb. 14, 2012

(87) PCT Pub. No.: WO2011/024474
PCT Pub. Date: Mar. 3, 2011

(65) Prior Publication Data

US 2012/0155354 A1 Jun. 21, 2012

(30) Foreign Application Priority Data

Aug. 28, 2009 (JP) ................................ 2009-198473

(51) Int. Cl.
*G08C 17/00* (2006.01)
*H04B 7/04* (2006.01)
(Continued)

(52) U.S. Cl.
CPC ............ *H04B 7/0452* (2013.01); *H04L 1/1692* (2013.01); *H04L 1/1861* (2013.01); *H04W 72/042* (2013.01); *H04L 1/0025* (2013.01)

(58) Field of Classification Search
CPC .......................... H04B 7/0452; H04W 72/042
See application file for complete search history.

(56) References Cited

U.S. PATENT DOCUMENTS

2008/0293424 A1 11/2008 Cho et al.
2009/0042558 A1* 2/2009 Shen et al. ................ 455/422.1

(Continued)

FOREIGN PATENT DOCUMENTS

CN 101523791 A 9/2009
CN 101595652 A 12/2009

(Continued)

OTHER PUBLICATIONS

G.J.Foschini, "Layered space-time architecture for wireless communication in a fading environment when using multi-element antennas", Bell Labs Tech.J, Autumn 1996, p. 41-59.

(Continued)

*Primary Examiner* — Shripal Khajuria
*Assistant Examiner* — Farhad Ali
(74) *Attorney, Agent, or Firm* — Pearne & Gordon LLP

(57) ABSTRACT

A wireless communication apparatus and a response control method wherein in a case of applying Persistent Allocation (PA) to MU-MIMO, the increase in the resources to be used in the feedback can be precluded. In a terminal, a response control unit causes, based on the type of downstream allocation control information, on an error detection result obtained by an error detecting unit and on a response rule table, a response signal to be transmitted by use of an upstream response resource designated in the downstream allocation control information. In the response rule table used in reception of a notification of MU-MIMO reallocation, respective different types of response signals are associated with a first case where there are no errors in the received downstream data of the designated resource designated in the downstream allocation control information received before that notification, a second case where the notification of MU-MIMO reallocation is successfully received and further there are no errors in the received downstream data of the designated resource, and a third case where the notification of MU-MIMO reallocation is not successfully received and further there are any errors in the received downstream data of the designated resource.

12 Claims, 26 Drawing Sheets

(51) Int. Cl.

| | |
|---|---|
| ***H04W 72/04*** | (2009.01) |
| ***H04L 1/16*** | (2006.01) |
| ***H04L 1/18*** | (2006.01) |
| *H04L 1/00* | (2006.01) |

(56) References Cited

U.S. PATENT DOCUMENTS

| | | | | |
|---|---|---|---|---|
| 2010/0075703 | A1 | 3/2010 | Imai et al. | |
| 2012/0039288 | A1 * | 2/2012 | Kim et al. | 370/329 |

FOREIGN PATENT DOCUMENTS

| | | | |
|---|---|---|---|
| CN | 101689975 | A | 3/2010 |
| CN | 101689980 | A | 3/2010 |
| JP | 2004-150137 | A | 5/2004 |
| JP | 2010-506505 | A | 2/2010 |
| JP | 2010-525723 | A | 7/2010 |
| WO | 2008/042904 | A2 | 4/2008 |
| WO | 2008/093619 | A1 | 8/2008 |
| WO | 2008/133454 | A1 | 11/2008 |
| WO | 2009/002244 | A1 | 12/2008 |
| WO | 2009/098869 | A1 | 8/2009 |

OTHER PUBLICATIONS

3GPP TS36.211 V8.3.0 (May 2008)m, "Physical Channels and Modulation".

IEEE P802.16m/D1, Draft Amendment to IEEE Standard for local and metropolitan area networks—Part 16: Air Interface for Broadband Wireless Access Systems—Advanced Air Interface, Jul. 2009.

IEEE C802.16m-09/1017, "Text proposal on DL MAP", Amir Khojastepour, Narayan Prasad, Sampath Rangarajan, Nader Zein, Tetsu Ikeda, Andreas Maeder (Apr. 27, 2009).

3GPP TSG-RAN WG1 Meeting 55bis, Jan. 12-16, 2009, Ljubljana, Slovenia, "HARQ protocol handling of CQI-only reports", R1-090250.

International Search Report for PCT/JP2010/005300 dated Oct. 5, 2010.

Japan Patent Office, Standard Technology Search Engine Database (MIMO-related technology), https://www.jpo.go.jp/shiryou/s_sonota/hyoujun_gijutsu/mimo/mokuji.htm, accessed online Aug. 28, 2009.

* cited by examiner

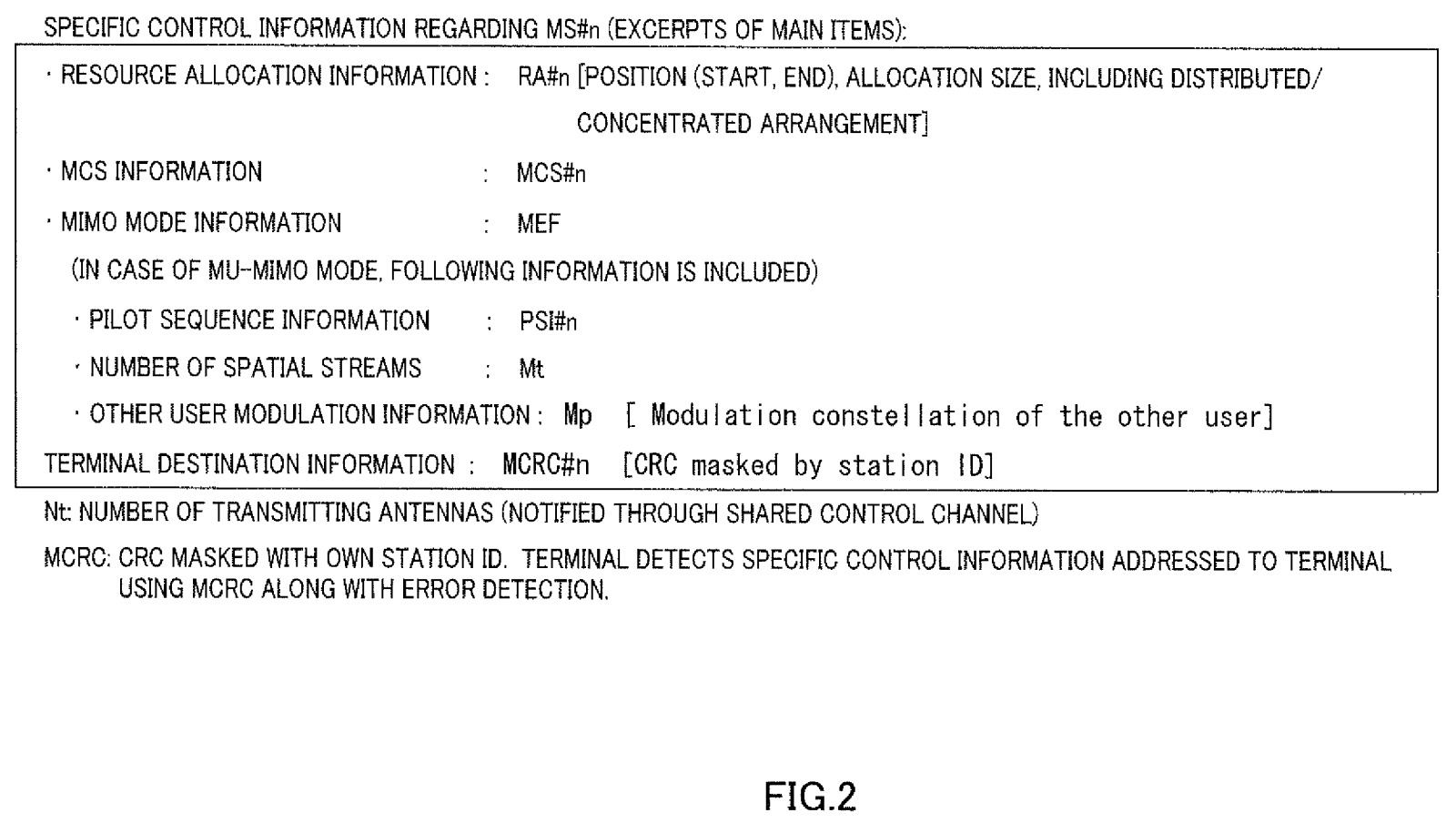

SPECIFIC CONTROL INFORMATION REGARDING MS#n (EXCERPTS OF MAIN ITEMS):

· RESOURCE ALLOCATION INFORMATION : RA#n [POSITION (START, END), ALLOCATION SIZE, INCLUDING DISTRIBUTED/ CONCENTRATED ARRANGEMENT]

· MCS INFORMATION : MCS#n

· MIMO MODE INFORMATION : MEF (IN CASE OF MU-MIMO MODE, FOLLOWING INFORMATION IS INCLUDED)

· PILOT SEQUENCE INFORMATION : PSI#n

· NUMBER OF SPATIAL STREAMS : Mt

· OTHER USER MODULATION INFORMATION : Mp [ Modulation constellation of the other user]

TERMINAL DESTINATION INFORMATION : MCRC#n [CRC masked by station ID]

Nt: NUMBER OF TRANSMITTING ANTENNAS (NOTIFIED THROUGH SHARED CONTROL CHANNEL)

MCRC: CRC MASKED WITH OWN STATION ID. TERMINAL DETECTS SPECIFIC CONTROL INFORMATION ADDRESSED TO TERMINAL USING MCRC ALONG WITH ERROR DETECTION.

FIG.2

| | |
|---|---|
| 0b00 | QPSK |
| 0b01 | 16QAM |
| 0b10 | 64QAM |
| 0b11 | N/A |

FIG.7

| | WHEN PA TERMINATION NOTIFICATION IS SUCCESSFULLY RECEIVED | WHEN PA TERMINATION NOTIFICATION RESULTS IN NG |
|---|---|---|
| RECEPTION RESPONSE HF1 | - (DTX) | NACK |
| RECEPTION RESPONSE HF2 | ACK | - (DTX) |

Figure 14:
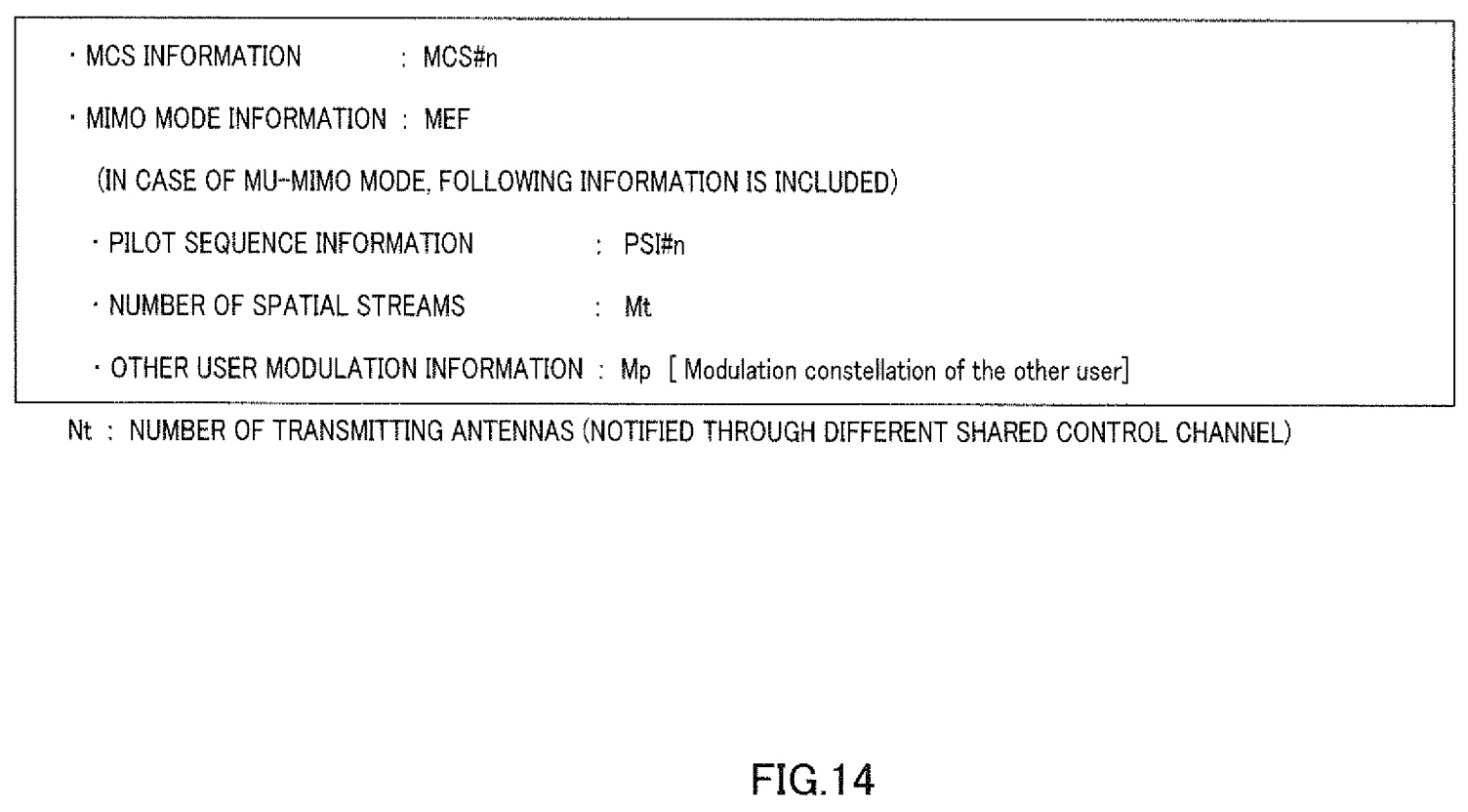

· MCS INFORMATION : MCS#n

· MIMO MODE INFORMATION : MEF (IN CASE OF MU-MIMO MODE, FOLLOWING INFORMATION IS INCLUDED)

· PILOT SEQUENCE INFORMATION : PSI#n

· NUMBER OF SPATIAL STREAMS : Mt

· OTHER USER MODULATION INFORMATION : Mp [ Modulation constellation of the other user]

Nt : NUMBER OF TRANSMITTING ANTENNAS (NOTIFIED THROUGH DIFFERENT SHARED CONTROL CHANNEL)

| | WHEN MU RE-ALLOCATION NOTIFICATION IS SUCCESSFULLY RECEIVED | | WHEN MU RE-ALLOCATION NOTIFICATION RESULTS IN NG | |
|---|---|---|---|---|
| | STATE ① | STATE ② | STATE ③ | STATE ④ |
| HF#2-1 (ALLOCATION FBCH AT EVENT OF PA#2 INITIATION NOTIFICATION) | (DTX) | | ACK | NACK |
| HF#2-2 (ALLOCATION FBCH AT EVENT OF PA#2 RE-ALLOCATION NOTIFICATION) | NACK | ACK | (DTX) | |

FIG.18

DL PERSISTENT A-MAP IE

| SYNTAX | SIZE IN BITS | DESCRIPTION/NOTES |
|---|---|---|
| DL PERSISTENT A-MAP_IE() { | – | – |
| A-MAP IE TYPE | 4 | DL PERSISTENT A-MAP IE |
| IF MCRC IS MASKED WITH STATION ID { | | |
| DL INDIVIDUAL PERSISTENT A-MAP_IE() | | REFER TO TABLE 676 |
| } ELSE IF MCRC IS MASKED WITH COMPOSITE ID { | | |
| DL COMPOSITE PERSISTENT A-MAP_IE() | | REFER TO TABLE 677 |
| } | | |
| } | | |

FIG.21

| RECEPTION RESPONSE OF FB CHANNEL | WHEN MU RE-ALLOCATION NOTIFICATION IS SUCCESSFULLY RECEIVED | WHEN MU RE-ALLOCATION COMPLETION NOTIFICATION RESULTS IN NG |
|---|---|---|
| USER #2 RECEPTION RESPONSE HF#2-1 | ACK | |
| | NACK2 | NACK |

WIRELESS COMMUNICATION APPARATUS AND RESPONSE CONTROL METHOD

TECHNICAL FIELD

The present invention relates to a radio communication apparatus and a response control method using a multiuser MIMO technology.

BACKGROUND ART

In recent years, there is a growing demand for greater-volume and faster radio communication, and studies are being actively carried out on methods of improving an effective utilization rate of limited frequency resources. As one such method, techniques using a space region are attracting attention.

A MIMO (Multiple Input Multiple Output) technology provides a plurality of antenna elements for both a transmitter and receiver and realizes spatially multiplexed transmission in a propagation environment with low correlativity of received signals between antennas (see Non-Patent Literature 1). In this case, the transmitter transmits a data sequence which differs from one antenna element to another from the plurality of attached antennas at the same time, the same frequency and using physical channels of the same code. The receiver separates and receives different data sequences from a received signal from the plurality of attached antennas based on a propagation channel estimation result. Using a plurality of such spatially multiplexed channels, it is possible to achieve faster data transmission without using M-ary modulation. In an environment when there are many scatterers between the transmitter and receiver under a condition with a sufficient S/N (signal-to-noise power ratio), if the same number of antennas are provided between the transmitter and receiver, it is possible to expand the communication capacity in proportion to the number of antennas.

Furthermore, as a different MIMO technology, a multiuser MIMO technology (Multiuser-MIMO or MU-MIMO) is known. The MU-MIMO technology is already being discussed in relation to a next-generation radio communication system standardization standard. The 3GPP-LTE standard or IEEE802.16m standard draft, for example, incorporates a transmission scheme based on multiuser MIMO in the standardization (e.g., see Non-Patent Literature 2 and Non-Patent Literature 3).

FIG. 1 shows a downlink frame format discussed in the IEEE802.16m standard draft. FIG. 2 shows an example of MU-MIMO allocation information corresponding to n-th terminal apparatus MS#n. FIG. 3 shows a configuration of a base station apparatus (hereinafter, may be simply described as "base station") and terminal apparatus (hereinafter, may be simply described as "terminal") that perform MU-MIMO transmission on a downlink based on the discussion on the IEEE802.16m standard draft.

FIG. 1 shows a frame format when time division (TDD) transmission is carried out. When transmitting data specific to a terminal (or user) in a specific data region of a downlink (region represented by "DL" in FIG. 1), a base station apparatus transmits the data by including resource allocation information to the terminal in specific control information transmitted to terminals in the area. In the IEEE802.16m standard in particular, resource allocation information is included in a region allocated as A-MAP (Advanced MAP). As shown in FIG. 2, resource allocation information RA#n for MS#n includes information on the position of data transmission region (DL-burst) to a specific user, allocation size and distributed/concentrated arrangement. Furthermore, MIMO mode information included in the specific control information indicates transmission information such as a spatial multiplexing mode or time/space diversity transmission mode. In the case of a MU-MIMO mode, the MIMO mode information further includes pilot sequence information PSI#n and the total number of spatial streams Mt during MU-MIMO communication. Furthermore, MCS information included in specific control information indicates an M-ary modulation value applicable to a spatial stream to terminal MS#n and information on the coding rate. Furthermore, MCRC included in the specific control information is CRC information masked with terminal identification information (CID: connection ID) assigned when a connection is established. With this, the terminal detects specific control information addressed to the terminal along with error detection.

The base station apparatus individually notifies MU-MIMO allocation information to terminals using the above-described downlink specific control channels prior to MU-MIMO transmission. As shown in FIG. 2, the MU-MIMO allocation information includes information on the number of spatial streams (Mt), MCS#n which is information on a coding rate of an error correction code applied to a spatial stream addressed to MS#n and modulation, pilot information (PSI#n) addressed to MS#n and resource allocation information RA#n addressed to MS#n, as parameters necessary for reception processing on the terminal MS#n side. Here, n=1, . . . , Mt. That is, a case is assumed here where one spatial stream is allocated to one terminal.

Here, distributed/concentrated arrangement information, position (start, end) information, allocation size information or the like are included as resource allocation information as described above.

In the IEEE802.16m standard draft, resources are arranged based on a physical resource unit (PRU) made up of a predetermined number of OFDM symbols and subcarriers. The predetermined number of pilot signals are arranged within the PRU. FIG. 4 shows one configuration example of the PRU in 2-stream transmission. Here, the PRU is made up of six OFDM symbols in the time direction and 18 subcarriers in the frequency direction. The PRU includes 12 pilot symbols and 96 data symbols.

There are two types of resources arrangement methods; concentrated arrangement and distributed arrangement. In the concentrated arrangement, subcarriers having relatively good receiving quality are continuously allocated as resources for a terminal, based on a receiving quality situation from the terminal. This is a resource arrangement method especially suitable for when the moving speed of the terminal is slow and a time variation of receiving quality is moderate. On the other hand, in the distributed arrangement, resources distributed on subcarriers are allocated to the terminal to make it easier to obtain a frequency diversity effect. This is a resource arrangement method especially suitable for when the moving speed of the terminal is fast and a time variation of receiving quality is violent.

1) Concentrated Arrangement (Continuous RU or Localized RU)

User specific data individually transmitted to terminals (specific data or user specific data) is allocated to a physical resource PRU based on the unit of a logical resource unit (LRU: Logical RU). Here, the LRU includes data corresponding to a number of data symbols other than pilot symbols included in the PRU. The LRU configuration data is allocated to data symbol arrangement portions in predetermined order in the PRU. Furthermore, resources are allocated to user specific data based on the unit of one PRU (that is, in miniband units) or based on the unit of n (n≥2) PRUs (that is, in subband units). FIG. 5 shows an example of resource concentrated arrangement using subbands with n=4.

2) Distributed Arrangement (Distributed RU)

The user specific data is allocated to a physical resource PRU using a logical resource unit (LRU: Logical RU) as a minimum unit. A plurality of items of LRU configuration data are arranged in a plurality of PRUs in a distributed manner according to a predetermined rule through subcarrier interleaving (or tone permutation). When a transmission diversity technique such as SFBC (Space-Frequency Block Coding) is applied, distributed arrangement is performed using two subcarriers as one unit to secure continuity between two subcarriers. That is, 2-subcarrier-based interleaving (or 2 tone based permutation) is performed. FIG. 6 shows an example of the distributed arrangement in this case.

Furthermore, a spatial stream addressed to terminal MS#n is formed by precoding modulated data signal #n addressed to terminal MS#n and pilot signal #n using common precoding weight #n. Mt spatial streams addressed to the terminal are spatially multiplexed. That is, Mt spatial streams addressed to the terminal are mapped to predetermined resources, OFDMA-modulated and transmitted. In this case, a precoded MIMO propagation channel can perform channel estimation using pilot signals precoded with the same precoding weight as that of data signals. Therefore, precoding information is unnecessary for MU-MIMO mode information. Furthermore, through frequency division multiplexing, pilot signals become orthogonal to each other between spatial streams. Therefore, MIMO propagation channels can be estimated by the terminal on the receiving side.

On the other hand, the terminal performs the following reception processing. First, the terminal receives a downlink-specific control channel and detects MU-MIMO allocation information addressed to the terminal. That is, the terminal extracts data of resources allocated for MU-MIMO transmission from the data subjected to OFDMA demodulation processing. The terminal then performs channel estimation on the MIMO propagation channel using pilot signals corresponding to the number of spatial streams (Mt).

The terminal then generates a reception weight based on the channel estimation result and pilot information (PSI) addressed to the terminal. In this case, linear reception processing such as an MMSE algorithm is performed. The terminal then separates streams addressed to the terminal from data of resources allocated to the terminal using the generated reception weight.

After separating streams addressed to the terminal, the terminal performs demodulation processing and decoding processing using the MCS information.

Furthermore, when terminal MS#n can perform maximum likelihood estimation (MLD) reception capable of obtaining high receiving quality, terminal MS#n performs MLD demodulation using modulation information of simultaneously and spatially multiplexed spatial streams addressed to other users (e.g., QPSK, 16 QAM, 64 QAM or the like). This other-user-related modulation information is included in specific control information. As disclosed in Non-Patent Literature 5, an MLD reception method generates a replica using channel estimate value H of a MIMO propagation channel and transmission signal candidate Sm, and determines a signal candidate that minimizes a Euclidean distance from received signal r as a transmission signal. Therefore, not only modulation information of spatial streams addressed to the terminal but also modulation information Mp of spatial streams including those addressed to other users are necessary to provide transmission signal candidate Sm used to generate a replica. This other user modulation information Mp is notified using two bits per one other user as shown, for example, in FIG. 7. When performing multiuser MIMO transmission, this makes MLD reception applicable to reception processing by the terminal, and can thereby improve receiving quality of the terminal.

Furthermore, according to the IEEE802.16m standard draft, a base station adopts a resources allocation method of periodically allocating the same resource to a terminal (e.g., see Non-Patent Literature 4). This allocation method is called "Persistent Allocation (PA)." The Persistent Allocation (PA) will now be described with reference to FIG. 8. FIG. 8 illustrates resources allocated to a downlink (DL) and uplink (UL) in the case where PA is applied to TDD transmission.

In a DL of FIG. 8, "PA-MAP" allocated to a k-th frame is a downlink allocation control channel for allocating downlink allocation control information of PA and a base station notifies the PA allocation target terminal of a PA initiation (resource allocation initiation) instruction using PA-MAP. Furthermore, in the DL of FIG. 8, "PA1" allocated to the k-th frame is a downlink data channel addressed to the PA allocation target terminal, and in the example shown in FIG. 8, the downlink data channel addressed to the PA allocation target terminal is periodically allocated in a period of N frames. Here, N is a frame unit repetition period and is a parameter indicated by PA-MAP. The above-described downlink allocation control channel (PA-MAP) is notified from the base station to the terminal at the events of "PA initiation (PA)," "PA reallocation" and "PA deallocation." FIG. 8 shows an example where the base station transmits PA-MAP that instructs "PA initiation" in a k-th frame to the terminal and transmits PA-MAP that instructs "PA deallocation" in a (k+m×N)-th frame. Here, m indicates an arbitrary integer value.

PA-MAP transmitted at the event of "PA initiation" contains information on a period of the downlink resource for allocating the downlink data channel, a position and size of the downlink resource, and an uplink resource (hereinafter also referred to as "data response resource") to feed back ACK/NACK (Acknowledgment/Negative Acknowledgment) which is a response signal for the downlink data to the base station or the like. The terminal receives the downlink data based on information on period N and the position of the downlink resource included in PA-MAP and transmits ACK/NACK in response to the received downlink data using the data response resource.

HF or HFA (HARQ Feedback Allocation) can be used as information indicating an uplink data response resource. HF indicates a resource number of the data response resource. An uplink channel through which downlink data and ACK/NACK for downlink allocation control information are transmitted is called a feedback channel (FBCH or HFRCH (HARQ Feedback Channel)).

For example, as shown in FIG. 8, when the base station transmits HF1 in a k-th frame at the event of "PA initiation," the terminal transmits ACK/NACK in response to downlink data using a resource of HFBCH corresponding to HF1.

PA-MAP that notifies a "PA termination" instruction includes information on an instruction that PA allocation terminates (PA deallocation) and an uplink resource for feeding back ACK/NACK which is a response signal to the "PA termination" instruction to the base station (hereinafter also referred to as "control response resource") or the like. The "PA termination" instruction (PA deallocation) is notified together with information of the allocation space allocated by the PA initiation instruction. As the information indicating a control response resource, HF can be used as in the case of the data response resource. Here, for the control response resource, a resource different from the data response resource allocated at the event of "PA initiation" is instructed. That is, suppose HF1 at the event of "PA initiation" and HF2 at the event of "PA termination" instruction have different values.

When the terminal normally receives PA-MAP transmitted from the base station and recognizes it to be a PA termination instruction (PA deallocation), the terminal transmits ACK to the base station as a normal reception response to the PA termination instruction using the control response resource instructed by HF2.

To be more specific, as shown in FIG. 8, when the base station instructs HF2 with PA-MAP that notifies a "PA termination" instruction in a (k+m×N)-th frame, the terminal transmits a response signal (in this case, only ACK) to the "PA termination" instruction using a resource of HFBCH corresponding to HF2. Since downlink data does not exist at the event of "PA termination," the terminal does not need transmission of ACK/NACK in response to the downlink data. Thus, at the event of "PA termination," the terminal transmits a response signal (ACK only) to the downlink allocation control information ("PA termination" instruction) using a resource different from the data response resource allocated at the event of "PA initiation" using the control response resource.

On the other hand, on the base station side, retransmission control (error handling processing, Error Handing) of the "PA termination" notification is performed as follows. That is, the base station detects response signals in HF1 at the event of "PA initiation" notification and in HF2 at the event of "PA termination" notification, and when a response signal at the event of the "PA termination" instruction cannot be detected as an ACK signal with the resource of HFBCH specified by HF2, retransmission control of the "PA termination" instruction is performed. This is because when the terminal cannot normally receive the "PA termination" instruction (that is, at the event of overlooking or reception NG), a response signal is transmitted using the data response resource instructed with HF1 at the event of "PA initiation" and a response signal to the "PA termination" instruction (in this case, ACK only) is transmitted using the resource of HFBCH corresponding to HF2 only when the "PA termination" instruction is normally received.

Next, FIG. 9 shows an example where the base station transmits PA-MAP for instructing "PA initiation" to the terminal in a k-th frame and transmits PA-MAP for instructing "PA re-allocation" to change the position of resource allocation for downlink data transmission in a (k+m×N)-th frame.

The PA-MAP transmitted at the event of "PA re-allocation" includes information on the position and size of the downlink resource of the downlink data channel for performing re-allocation, the period of the downlink resource and data response resource for feeding back ACK/NACK (Acknowledgment/Negative Acknowledgment) which is a response signal to the downlink data to the base station or the like. The terminal receives the downlink data based on information on period N and the position of the downlink resource included in PA-MAP and transmits ACK/NACK in response to the received downlink data using the data response resource. Here, for the data response resource, a resource different from the data response resource allocated at the event of "PA initiation" is instructed. That is, suppose HF1 at the event of "PA initiation" and HF2 at the event of a "PA re-allocation" instruction have different values.

To be more specific, as shown in FIG. 9, when the base station instructs HF2 in PA-MAP that notifies a "PA re-allocation" instruction in the (k+m×N)-th frame, the terminal transmits ACK/NACK in response to downlink data (PA2) of the downlink resource specified with "PA re-allocation" using the resource of HFBCH corresponding to HF2.

Furthermore, since downlink data channels are periodically allocated in a period of N frames in following frames, the terminal transmits ACK/NACK in response to the downlink data (PA2) at the position of the downlink resource instructed by "PA re-allocation" for every N frames using the resource of HFBCH corresponding to HF2.

On the other hand, the base station side performs error handling processing in response to "PA re-allocation" notification as follows. That is, the base station side detects response signals in HF1 at the event of "PA initiation" notification and HF2 at the event of "PA re-allocation" notification, and performs retransmission control of the "PA re-allocation" instruction when the response signal at the event of the "PA re-allocation" instruction cannot be detected as an ACK signal or NACK signal with the resource of HFBCH specified by HF2. This is because when the terminal cannot normally receive the "PA re-allocation" instruction (at the event of overlooking or reception NG), a response signal to data (PA1) at the downlink data position specified at the event of "PA initiation" notification is transmitted using the data response resource instructed with HF1 at the event of "PA initiation" and only when the "PA re-allocation" instruction is normally received, a data response signal for the "PA re-allocation" instruction is transmitted using the resource of HFBCH corresponding to HF2.

CITATION LIST

Non-Patent Literature

NPL 1

G. J. Foschini, "Layered space-time architecture for wireless communication in a fading environment when using multi-element antennas", Bell Labs Tech. J, Autumn 1996, P. 41-59

NPL 2

3GPP TS36.211 V8.3.0 (2008-05)

NPL 3

IEEE P802.16m/D1, DRAFT Amendment to IEEE Standard for local and metropolitan area networks—Part 16: Air Interface for Broadband Wireless Access Systems—Advanced Air Interface, July 2009

NPL 4

IEEE C802.16m-09/1017, "Text proposal on DL MAP", Amir Khojastepour, Narayan Prasad, Sampath Rangarajan, Nader Zein, Tetsu Ikeda, Andreas Maeder (2009 Apr. 27)

NPL 5

Japan Patent Office, Standard Technology Search Engine Database (MIMO-related technology), https://www.jpo.go.jp/shiryou/s_sonota/hyoujun_gijutsu/mimo/mokuji.htm

SUMMARY OF INVENTION

Technical Problem

By the way, above-described PA is also applicable to MU-MIMO transmission. FIG. 10 shows resources allocated to a downlink (DL) and uplink (UL) during MU-MIMO transmission using PA. FIG. 10 shows an example of a case where PA-MAP is individually notified for each terminal (DL Individual Persistent A-MAP IE), in particular.

The PA-MAP at the event of PA initiation (PA initiation #1, PA initiation #2) further contains the MU-MIMO control information shown in FIG. 2. Furthermore, while the period of downlink resources to which downlink data channels of PA initiation #1 and PA initiation #2 are allocated and the positions of the downlink resources are common, data response resources for feeding back ACK/NACK (Acknowledgment/Negative Acknowledgment) which is a response signal for the downlink data to the base station are different between PA initiation #1 and PA initiation #2. That is, for HF#1-1 and HF#2-1, different data response resources are allocated. Furthermore, PA-MAP (PA termination #1, PA termination #2) that notifies a "PA termination" instruction contains information on an instruction (PA deallocation) that PA allocation terminates and a "control response resource" for feeding back ACK/NACK which is a response signal to the "PA termination" instruction to the base station or the like. That is, PA-MAP that notifies the "PA termination" instruction contains information on the allocation space allocated according to the PA initiation instruction. Here, as the control response resource, a resource different from the data response resource allocated at the event of "PA initiation" is allocated. That is, suppose HF#1-1 at the event of "PA initiation" and HF#1-2 at the event of the "PA termination" instruction have different values. Suppose HF#2-1 and HF#2-2 also have different values likewise.

Thus, a plurality of terminals (users) can periodically share the same physical resource using spatial multiplexing.

However, notification timing of PA termination is generally not common among users performing MU-MIMO transmission. Conversely, if the range of application of MU-MIMO is limited to a combination of users having common notification timing of PA termination, the base station needs to search such a combination of users to perform MU-MIMO transmission, resulting in an increase in its burden of scheduling. Furthermore, when there are fewer combinations of users having common notification timing of PA termination, chances of using MU-MIMO are reduced. As a result, spatially multiplexed transmission using MU-MIMO cannot be flexibly used, making it impossible to enjoy the merits of improvement of frequency utilization efficiency.

FIG. 11 shows an example of a case where PA termination is notified to user #2 using spatial stream #2 for a period during which PA of user #1 using spatial stream #1 continues. After notifying PA termination to user #2 using spatial stream #2, only spatial stream #1 remains, resulting in a situation different from that of the parameter of MU-MIMO transmission at the event of PA initiation.

In such a situation, when user #1 performs MLD reception, user #1 generates a reception replica based on the channel estimation result obtained from a pilot signal included in spatial stream #2 on a premise that there is a MIMO channel through which spatial stream #2 is transmitted. That is, also when there is no transmission data addressed to user #2, if only a pilot signal is transmitted as in the case of distributed arrangement (DRU), user #1 may generate a wrong reception replica, which makes normal reception impossible. On the other hand, when user #1 performs MMSE reception, reception processing of suppressing a spatial stream of user #2 is performed based on a pilot signal regardless of the presence or absence of transmission data addressed to user #2. For this reason, user #1 can perform normal reception.

The reason that transmission of a pilot signal is always necessary in distributed arrangement (DRU) is as follows. When distributed arrangement (DRU) is used, data of user #2 is arranged distributed in a plurality of PRUs. For this reason, if no pilot signal of PRU is sent (that is, transmission power is assumed to be 0) for the reason that there is no data to be transmitted to user #2, data addressed to other users other than user #2 is included in the same PRU, and therefore the channel estimation accuracy deteriorates when performing data demodulation. Therefore, when the PA termination timing differs between MU-MIMO users, "it is necessary to notify a variation of the spatial multiplexing number to remaining users at PA termination notification timing of the other users" to secure reception characteristics of MLD reception users.

FIG. 12 shows an example of a case where MU-MIMO notification is performed for which a spatial multiplexing number is changed at the event of PA termination notification. In particular, FIG. 12 shows an example of a case where PA-MAP is individually notified for each terminal (DL Individual Persistent A-MAP IE).

In a frame (k+m×N) in which PA termination notification (PA deallocation #1) addressed to user #1 is performed, "re-allocation" notification (MU-MIMO parameter re-notification) addressed to user #2 is performed. Using PA-MAP (PA re-allocation #2) that notifies a "re-allocation" instruction, a change of the MU-MIMO transmission parameter is notified. PA-MAP (PA re-allocation #2) includes not only information on an allocation space allocated by a PA initiation instruction (PA initiation #2) but also information on a data response resource or the like to feed back ACK/NACK, which is a response signal to the data, to the base station. Here, a resource different from the data response resource allocated at the event of "PA initiation" (that is, allocated by PA initiation #2) is allocated as the data response resource. That is, suppose HF (HF#2-1) at the event of "PA initiation" (that is, PA initiation #2) and HF (HF#2-2) at the event of a "re-allocation" instruction have different values.

User #2 transmits a reception response (ACK/NACK) of the data transmitted through PA#2 to the base station using a resource of HFBCH instructed by HF#2-1 or HF#2-2 according to the reception situation of PA re-allocation #2. Upon detecting a data reception response through the HFBCH resource instructed by HF#2-1, the base station performs retransmission control over the PA re-allocation notification as error handling processing.

When PA is simply applied to MU-MIMO transmission as described above, although there is no change in resources allocated to downlink data of the terminal that continues communication, there is a problem that due to error handling processing on the PA re-allocation notification, extra resources of the feedback (FB) channel (resources specified by HF#2-2 in FIG. 12) are required.

Furthermore, a method may also be considered whereby as shown in FIG. 10, PA allocation termination is notified to the respective MU-MIMO users and then PA allocation is notified to specific users again. However, in this case, PA termination and PA initiation need to be performed, and time resources and HFBCH resources become more redundant than the above-described technique.

It is an object of the present invention to provide a radio communication apparatus and a response control method that prevent, when PA is applied to MU-MIMO, the number of resources used for feedback from increasing.

Solution to Problem

A radio communication apparatus according to the present invention is a radio communication apparatus that periodically receives a downlink data group addressed to the radio communication apparatus transmitted in a multiuser MIMO communication for simultaneously transmitting a plurality of transmission data to a group including a plurality of radio communication apparatuses on downlink data resources indicated by downlink allocation control information, including: a reception section that receives downlink allocation control information and the downlink data addressed to the radio communication apparatus; a determination section that determines a type of the received downlink allocation control information; an error detection section that detects a reception error of the received downlink data; and a response control section that transmits response signals corresponding to the downlink allocation control information and the received downlink data on uplink response resources including a control information response resource specified by the downlink allocation control information and a received data response resource, based on the type determined, a detection result of the reception error and a reception response rule, wherein according to the reception response rule used in a reception frame of downlink allocation control information regarding re-allocation, response signals of different types are associated with a first case where no error is detected in received downlink data of a specified resource being specified by downlink allocation control information received before the downlink allocation control information regarding the re-allocation; a second case where the downlink allocation control information regarding the re-allocation is successfully received and no error is detected in the received downlink data of the specified resource; and a third case where the downlink allocation control information regarding the re-allocation is not successfully received and an error is detected in the received downlink data of the specified resource; and resources used for the response signals in the reception frame of the downlink allocation control information regarding the re-allocation are the same resources as data response resources specified by the downlink allocation control information received before the downlink allocation control information regarding the re-allocation in any one of the first to third cases.

A response control method according to the present invention includes a receiving step of periodically receiving a downlink data group transmitted in a multiuser MIMO communication for simultaneously transmitting a plurality of downlink data to a group including a plurality of radio communication apparatuses on downlink data resources indicated by downlink allocation control information addressed to the radio communication apparatus; a determining step of determining a type of the received downlink allocation control information in the receiving step; an error detecting step of detecting a reception error of the received downlink data in the receiving step; and a response control step of transmitting response signals corresponding to the downlink allocation control information and the received downlink data on uplink response resources including a control response resource and a data response resource specified by the downlink allocation control information based on the type determined in the determining step and an error detection result obtained in the error detecting step, wherein in the response step in a reception frame of the downlink allocation control information regarding re-allocation, response signals of different types are generated in a first case where no error is detected in received downlink data of resources specified by downlink allocation control information received before the downlink allocation control information regarding re-allocation, a second case where the downlink allocation control information regarding re-allocation is successfully received and no error is detected in the received downlink data of the specified resources and a third case where the downlink allocation control information regarding re-allocation is not successfully received and an error is detected in the received downlink data of the specified resources, and the response signals generated are transmitted using the same resources as the data response resources specified by the downlink allocation control information received before the downlink allocation control information regarding re-allocation in any one of the first to third cases.

Advantageous Effects of Invention

According to the present invention, when PA is applied to MU-MIMO, it is possible to provide a radio communication apparatus and a response control method that prevent the number of resources used for feedback from increasing.

BRIEF DESCRIPTION OF DRAWINGS

FIG. 2 is a diagram illustrating an example of MU-MIMO allocation information;

FIG. 7 is a diagram illustrating other user modulation information Mp;

FIG. 14 is a diagram illustrating control information during MU-MIMO transmission;

FIG. 18 is a diagram illustrating a reception response rule;

FIG. 21 is a diagram illustrating contents of collective PA notification of a plurality of users;

DESCRIPTION OF EMBODIMENTS

Figure 1:
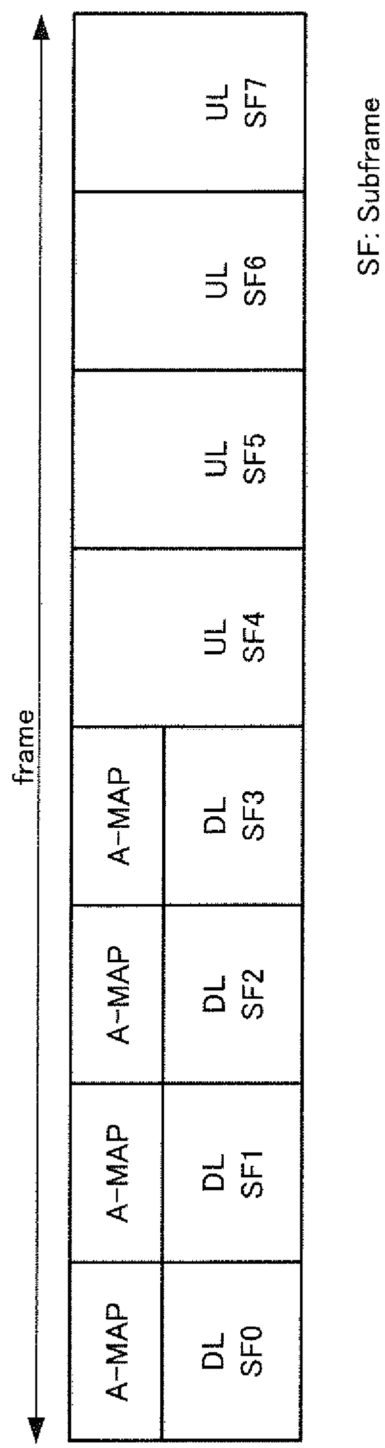
FIG. 1 shows a frame format in a case where time division (TDD) transmission according to the IEEE802.16m draft standard is performed.

Hereinafter, embodiments of the present invention will be described in detail with reference to the accompanying drawings. In the embodiments, the same components will be assigned the same reference numerals and overlapping descriptions thereof will be omitted.

Embodiment 1

Configuration of Base Station 100

Figure 13:
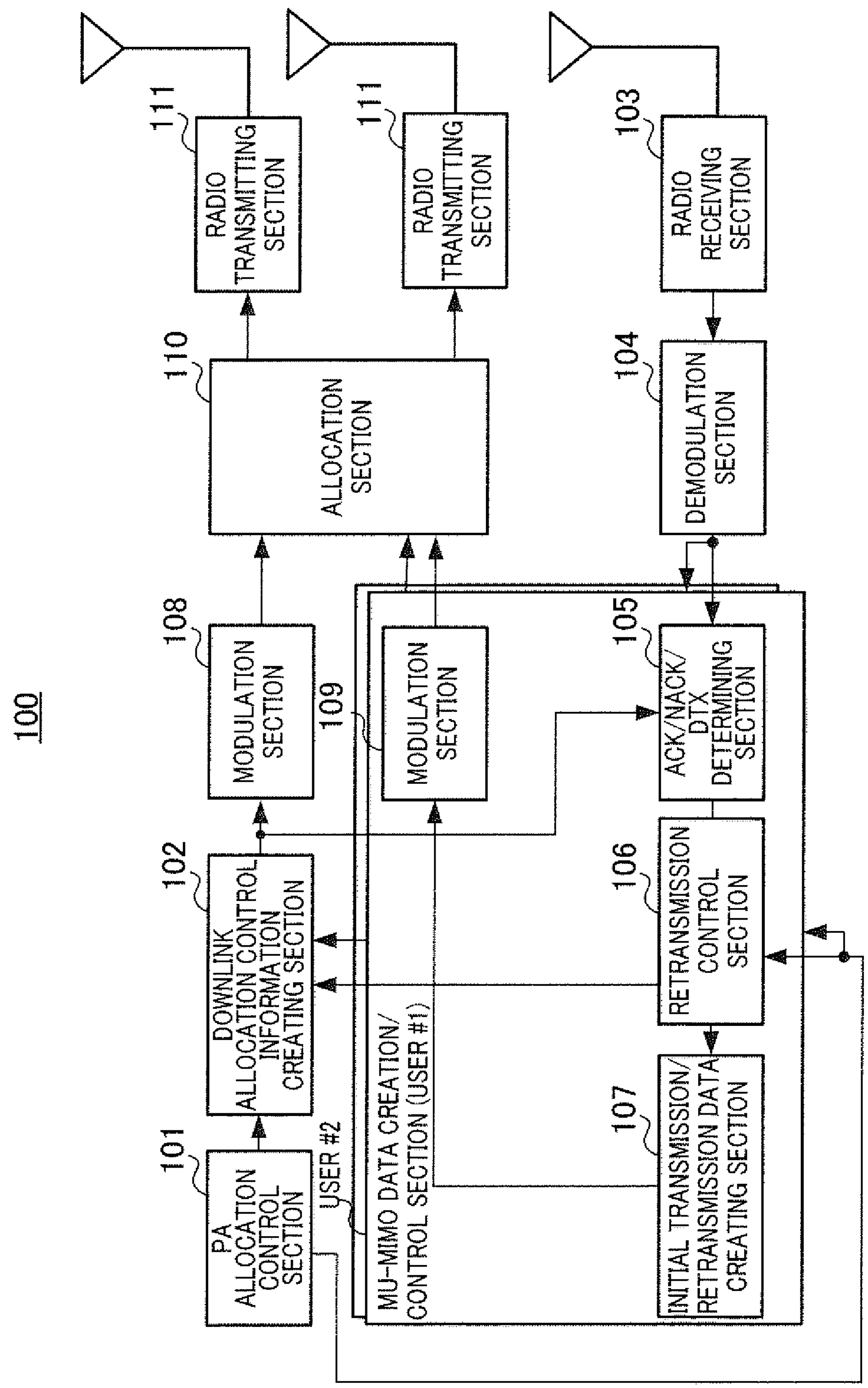
FIG. 13 is a block diagram showing a main part configuration of a base station according to Embodiment 1 of the present invention.

FIG. 13 is a block diagram showing a main part configuration of base station 100 according to Embodiment 1 of the present invention. In FIG. 13, base station 100 includes PA allocation control section 101, downlink allocation control information creation section 102, radio reception section 103, demodulation section 104, ACK/NACK/DTX determination section 105, retransmission control section 106, initial transmission/retransmission data creation section 107, modulation sections 108 and 109, allocation section 110 and radio transmission section 111.

PA allocation control section 101 determines which of "PA initiation," "PA re-allocation," "MU-MIMO re-allocation" or "PA deallocation" is performed on transmission data addressed to each terminal. PA allocation control section 101 outputs the determination result to downlink allocation control information creation section 102 and retransmission control section 106.

Downlink allocation control information creation section 102 determines the period of the downlink data resource for allocating the downlink data channel, the size and the position of the downlink data resource, and the ACK/NACK resource (data response resource) for the downlink data, creates information thereon, and outputs the result to modulation section 108. Hereinafter, description will be made for an exemplary case where the HF number is used as an indicator for indicating the data response resource at the event of "PA initiation." The HF number matches with the channel (HFBCH) of the uplink response resource on a one-by-one basis. Furthermore, when MU-MIMO is performed, the downlink allocation control information also contains information shown in FIG. 14.

At the event of "PA re-allocation," downlink allocation control information creation section 102 determines an allocation space change instruction and the ACK/NACK resource (data control response resource) for the downlink data signal after the change of the allocation space and outputs this information to modulation section 108 and also outputs the information related to the MU-MIMO transmission shown in FIG. 14 to modulation section 108. The allocation space change instruction contains information on the resource size and the position of the downlink data resource after the change. If information different from the information on the resource size or the position of the downlink data resource notified by the change instruction of the allocation change in the past is notified, the terminal recognizes that "PA re-allocation" has been notified. A resource different from the data response resource before the change of the allocation space is allocated as the data response resource after the change of the allocation space.

At the event of "MU-MIMO re-allocation," downlink allocation control information creation section 102 outputs information on the allocation space allocated by a PA initiation instruction and ACK/NACK resource (data response resource) information for a downlink data signal to modulation section 108 and also outputs the information regarding the MU-MIMO transmission shown in FIG. 14 to modulation section 108. Thus, an MU-MIMO re-allocation notification is transmitted from base station 100. Here, as described above, the "MU-MIMO re-allocation notification" refers to a notification transmitted from the base station to a terminal whose communication continues when, for example, communication of some of a plurality of terminals to which a downlink data signal is transmitted together in MU-MIMO transmission terminates before the other terminals. The data response resource and control response resource specified by this MU-MIMO re-allocation notification matches with the data response resource specified by the PA initiation notification or the data response resource specified by the PA re-allocation notification when a PA re-allocation notification is received after the PA initiation notification. That is, the data response resource and control response resource specified by the MU-MIMO re-allocation notification matches with the PA initiation notification received immediately before or data response resource specified by the PA re-allocation notification.

Furthermore, at the event of "PA termination," downlink allocation control information creation section 102 outputs, to modulation section 108, information on the control response resource to feed back to base station 100 a PA allocation terminating instruction (PA deallocation) and the ACK/NACK resource which is a response signal for the "PA termination" instruction together with information on the allocation space allocated by the PA initiation instruction. The PA allocation terminating instruction is notified to the terminal, more specifically, by setting the data regarding the resource size of the downlink data resource to 0.

Downlink allocation control information creation section 102 outputs information on the uplink data response resource and the control response resource to ACK/NACK/DTX determination section 105.

Furthermore, downlink allocation control information creation section 102 outputs the downlink allocation control information to modulation section 108, based on the determination result from retransmission control section 106. To be more specific, when the determination result from retransmission control section 106 includes overlooking of "PA re-allocation", overlooking of "MU-MIMO re-allocation" or overlooking of "PA termination," downlink allocation control information creation section 102 outputs the previously transmitted downlink allocation control information at the event of "PA re-allocation," "MU-MIMO re-allocation" or "PA termination" to modulation section 108.

Radio reception section 103 receives the signal transmitted from the terminal through a reception antenna and performs a reception process such as down-conversion, A/D conversion, and Fast Fourier Transform (FFT) for the received signal. Demodulation section 104 demodulates the received signal subjected to the radio reception process.

The received signal demodulated by demodulation section 104 is outputted to ACK/NACK/DTX determination section 105. Here, ACK/NACK/DTX determination section 105, retransmission control section 106, modulation section 109, and initial transmission/retransmission data creation section 107, which will be described later, are provided for each terminal involving MU-MIMO transmission and perform processing for each terminal when performing MU-MIMO transmission.

ACK/NACK/DTX determination section 105 extracts a response signal transmitted through an uplink response resource from the demodulated received signal, based on information of the data response resource or control response resource (hereinafter, a combination of these resources may also be described as "uplink response resource") notified from downlink allocation control information creation section 102. Then, ACK/NACK/DTX determination section 105 determines which of ACK, NACK or DTX the extracted response signal indicates. For example, if the power of the response signal is lower than a predetermined threshold value, ACK/NACK/DTX determination section 105 determines that the terminal transmits neither ACK nor NACK (DTX) using the uplink response resource. On the other hand, if the power of the response signal is equal to or higher than a predetermined threshold value, it is determined which of ACK or NACK the response signal indicates. ACK/NACK/DTX determination section 105 outputs, to retransmission control section 106, the determination result on which of ACK, NACK or DTX the response signal indicates.

Retransmission control section 106 determines, based on the determination result from PA allocation control section 101 and the determination result from ACK/NACK/DTX determination section 105, which of the following states the terminal recognizes; "PA initiation" completed or overlooked, "PA re-allocation" completed or overlooked, "MU-MIMO re-allocation" completed or overlooked, "PA termination" completed or overlooked, and the downlink transmission data successfully received or not successfully received. The determination result from PA allocation control section 101 contains information regarding which of "PA initiation," "PA re-allocation," or "PA termination" base station 100 determines to perform. Retransmission control section 106 determines whether or not the terminal successfully receives the downlink data based on the determination result from PA allocation control section 101 and the determination result from ACK/NACK/DTX determination section 105. The determination method of retransmission control section 106 will be described later. Retransmission control section 106 outputs the determination results to initial transmission/retransmission data creation section 107 and downlink allocation control information creation section 102.

Initial transmission/retransmission data creation section 107 outputs, to modulation section 109, any one of the initial transmission downlink data or the retransmission downlink data based on the determination result from retransmission control section 106. Specifically, if the data reception determination result in a terminal indicates an error, initial transmission/retransmission data creation section 107 outputs retransmission downlink data to modulation section 109. Otherwise, if the data reception determination result in a terminal indicates no error, initial transmission/retransmission data creation section 107 outputs the initial transmission downlink data to modulation section 109.

Modulation section 108 applies error correcting coding to the downlink allocation control information and further performs modulation processing thereon.

Modulation section 109 applies error correcting coding to the initial transmission downlink data or the retransmission downlink data from initial transmission/retransmission data creation section 107 and further performs modulation processing thereon.

Figure 3:
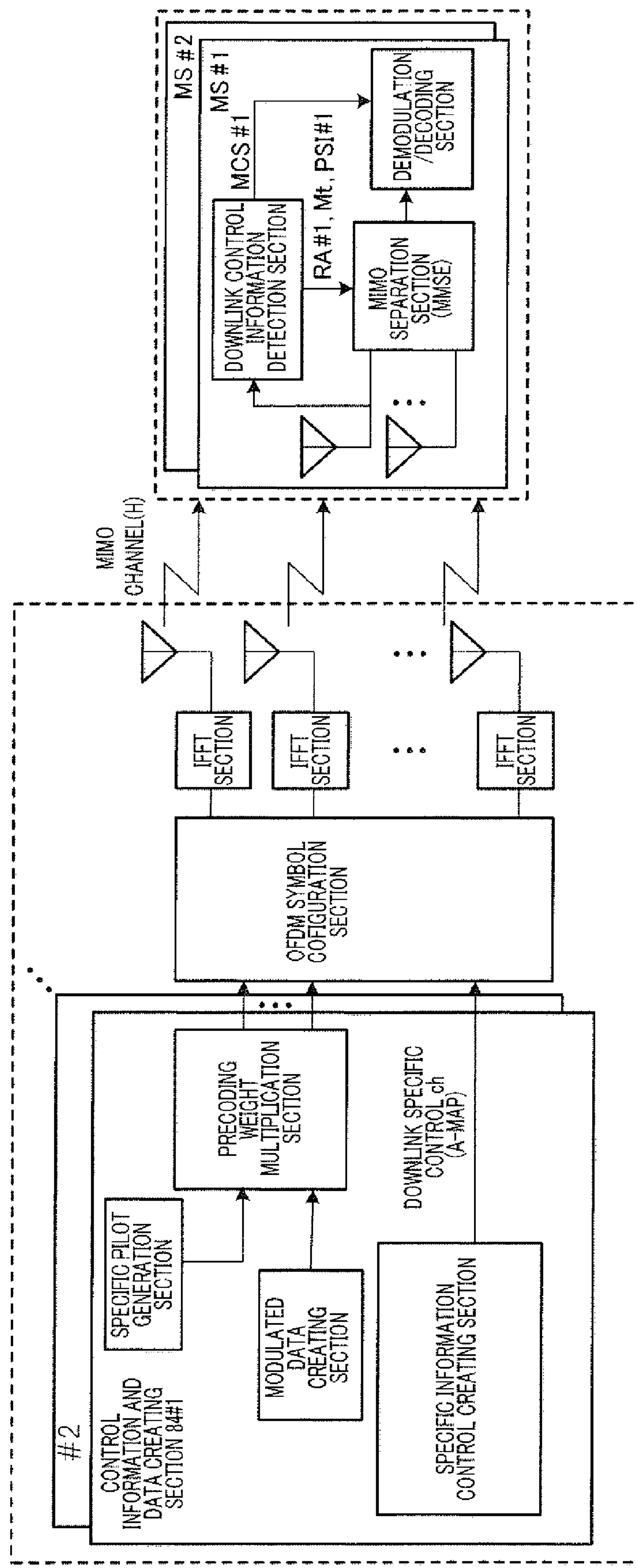
FIG. 3 is a block diagram showing a configuration of a base station apparatus and a terminal apparatus that perform MU-MIMO transmission on a downlink based on discussions in the IEEE802.16m standard draft.
Figure 4:
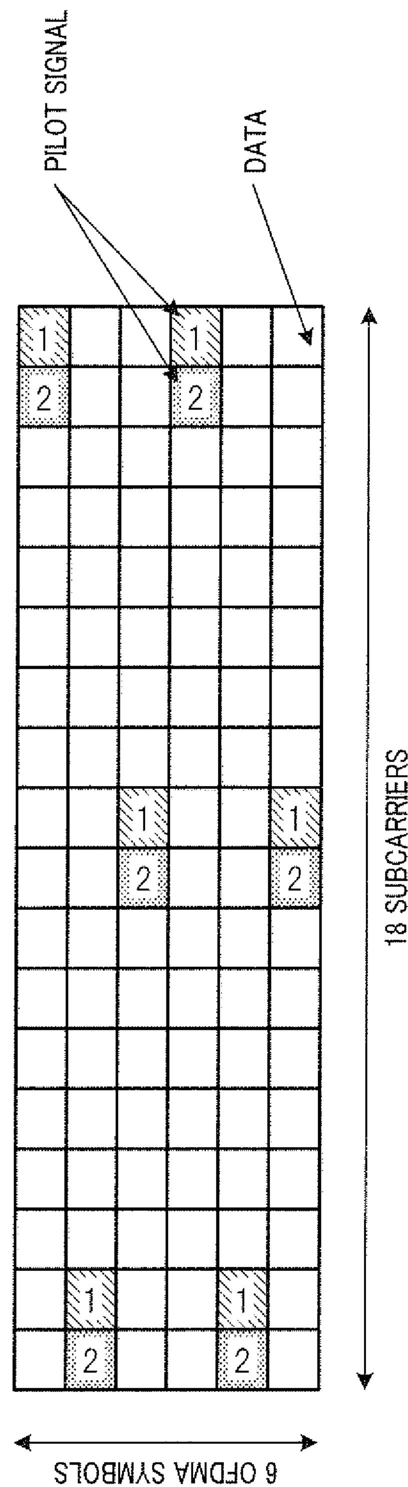
FIG. 4 is a diagram illustrating one configuration example of a physical resource unit (PRU) during two-stream transmission.
Figure 5:
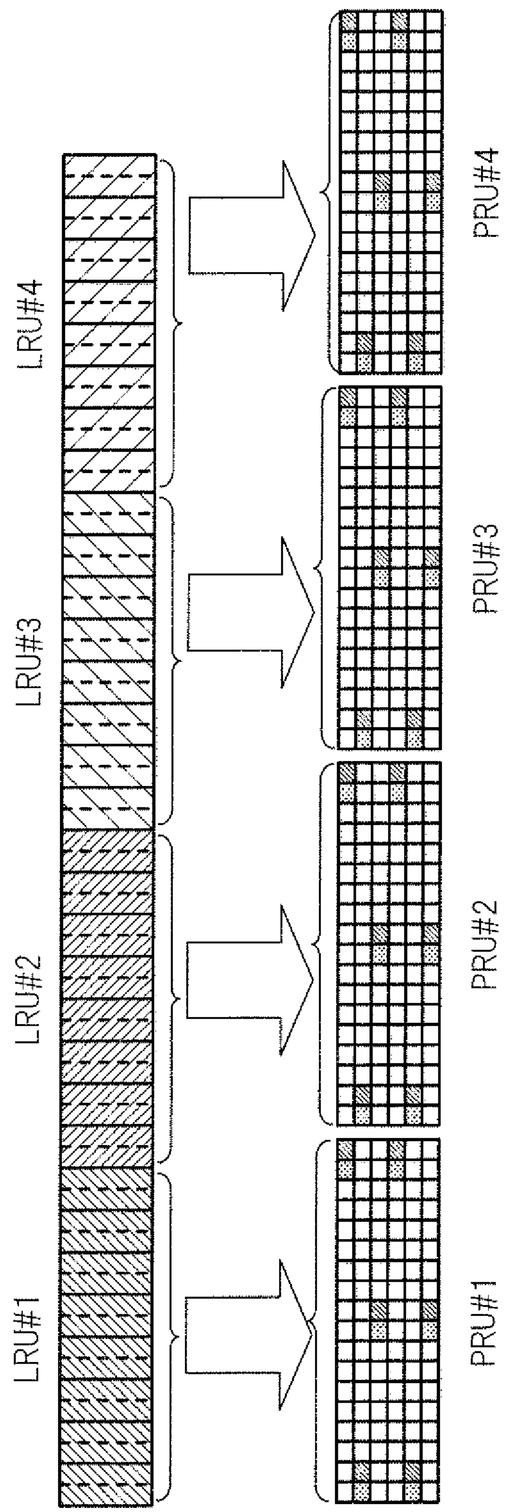
FIG. 5 is a diagram illustrating an example of resource concentrated arrangement.
Figure 6:
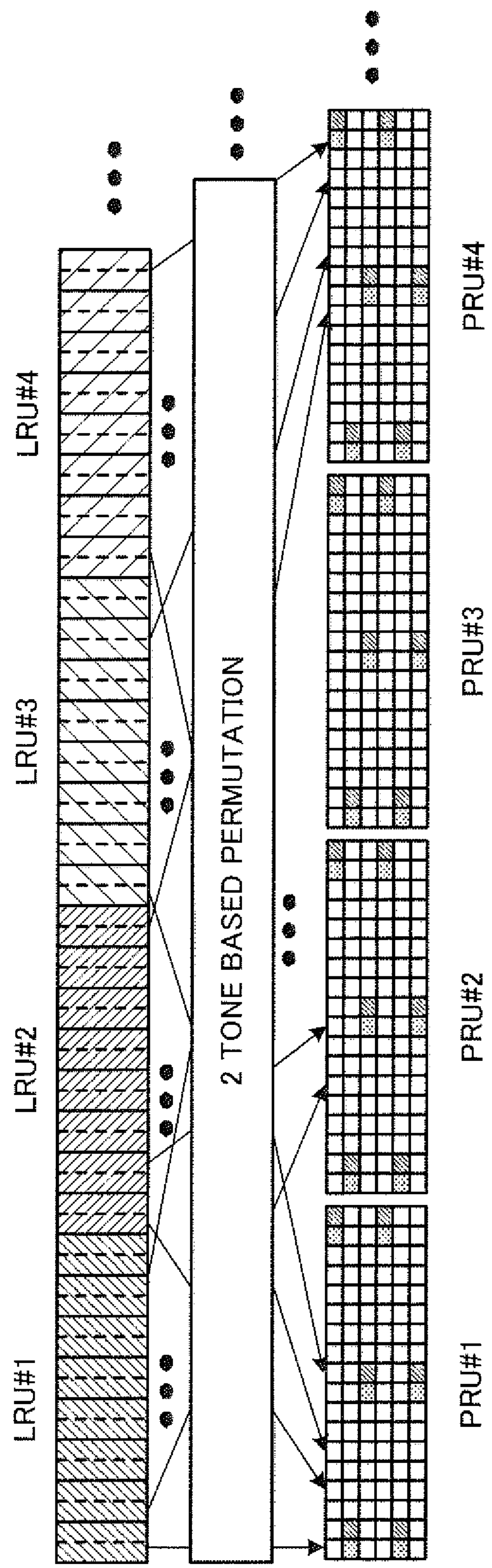
FIG. 6 is a diagram illustrating an example of distributed arrangement.
Figure 8:
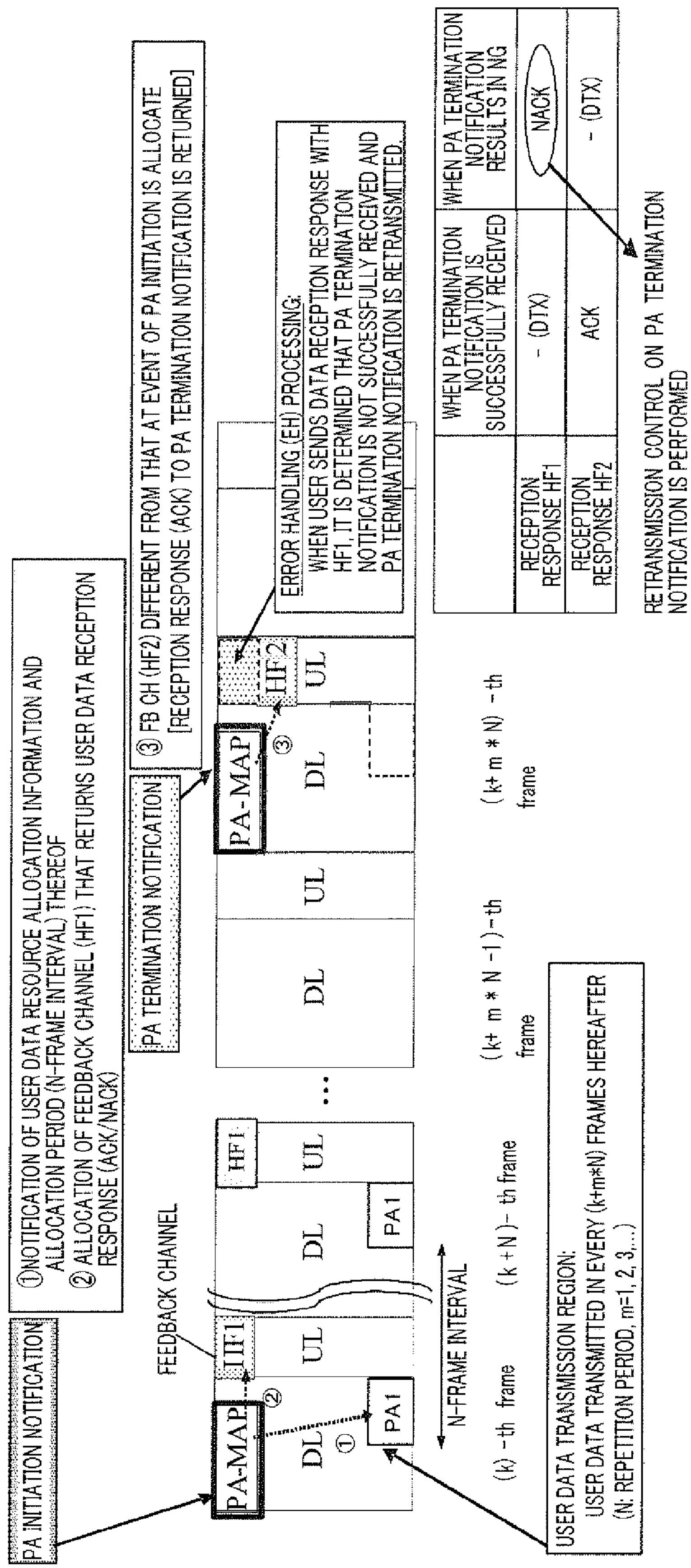
FIG. 8 is a diagram illustrating Persistent Allocation (PA)
Figure 9:
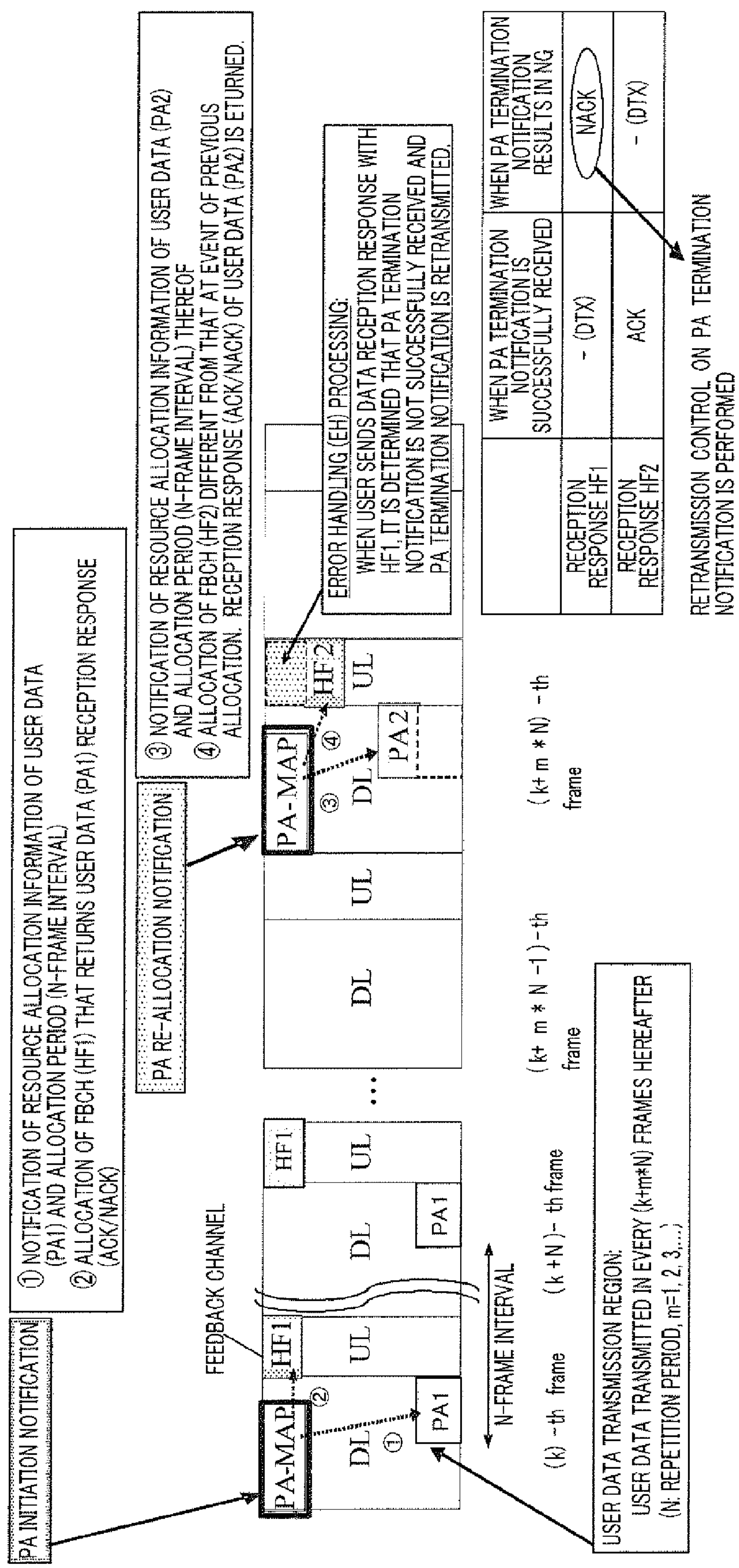
FIG. 9 is a diagram illustrating PA re-allocation.
Figure 10:
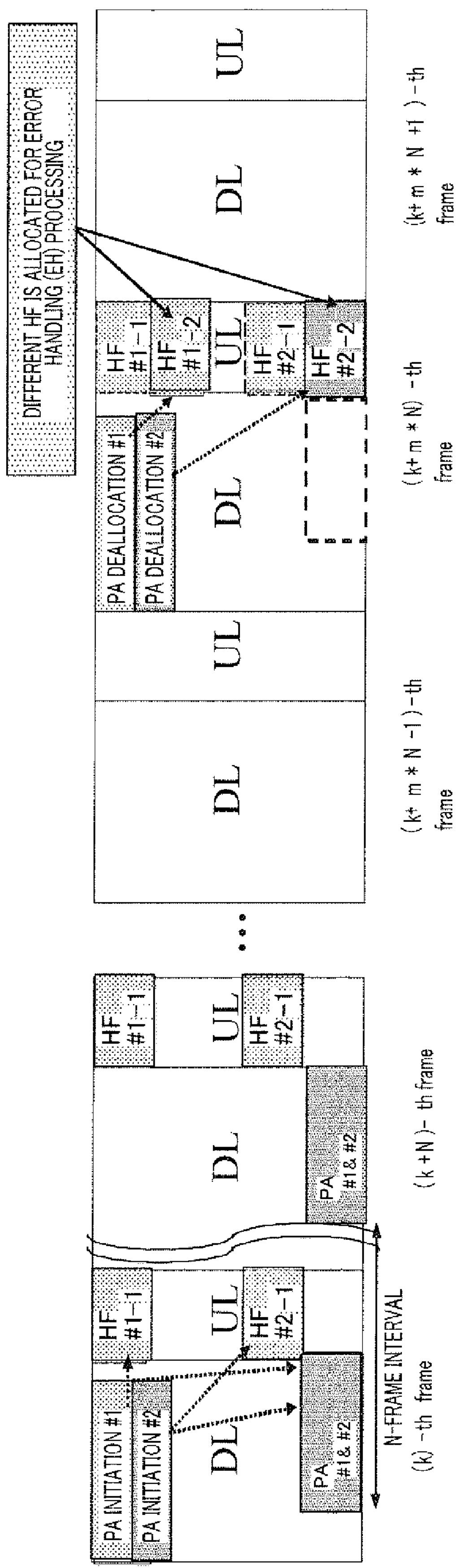
FIG. 10 is a diagram illustrating MU-MIMO transmission using PA.
Figure 11:
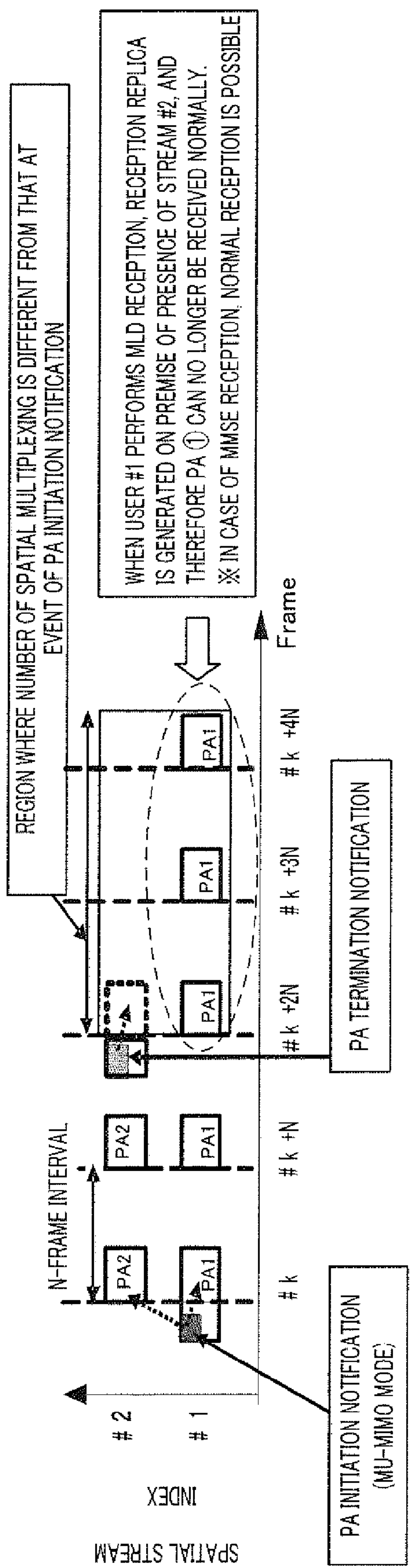
FIG. 11 is a diagram illustrating MU-MIMO transmission using PA.

Allocation section 110 allocates the modulated downlink data to the downlink data resource indicated by the downlink allocation control information and allocates the modulated downlink allocation control information to the downlink control resource of PA-MAP. Furthermore, when downlink data is MU-MIMO-transmitted, as shown in FIG. 3, the downlink data is multiplied by a predetermined precoding weight together with specific pilot signals orthogonal to each other among spatial streams and the resulting data is outputted via a plurality of (Nt) radio transmission sections 111 and Nt transmission antennas.

Radio transmission section 111 performs a radio transmission process such as IFFT (Inverse Fast Fourier Transform) process, D/A conversion, amplification, and up-conversion for the modulated signal allocated to the downlink data resource and the downlink control resource and transmits the signal subjected to the radio transmission process through a transmission antenna.

[Configuration of Terminal 200]

Figure 15:
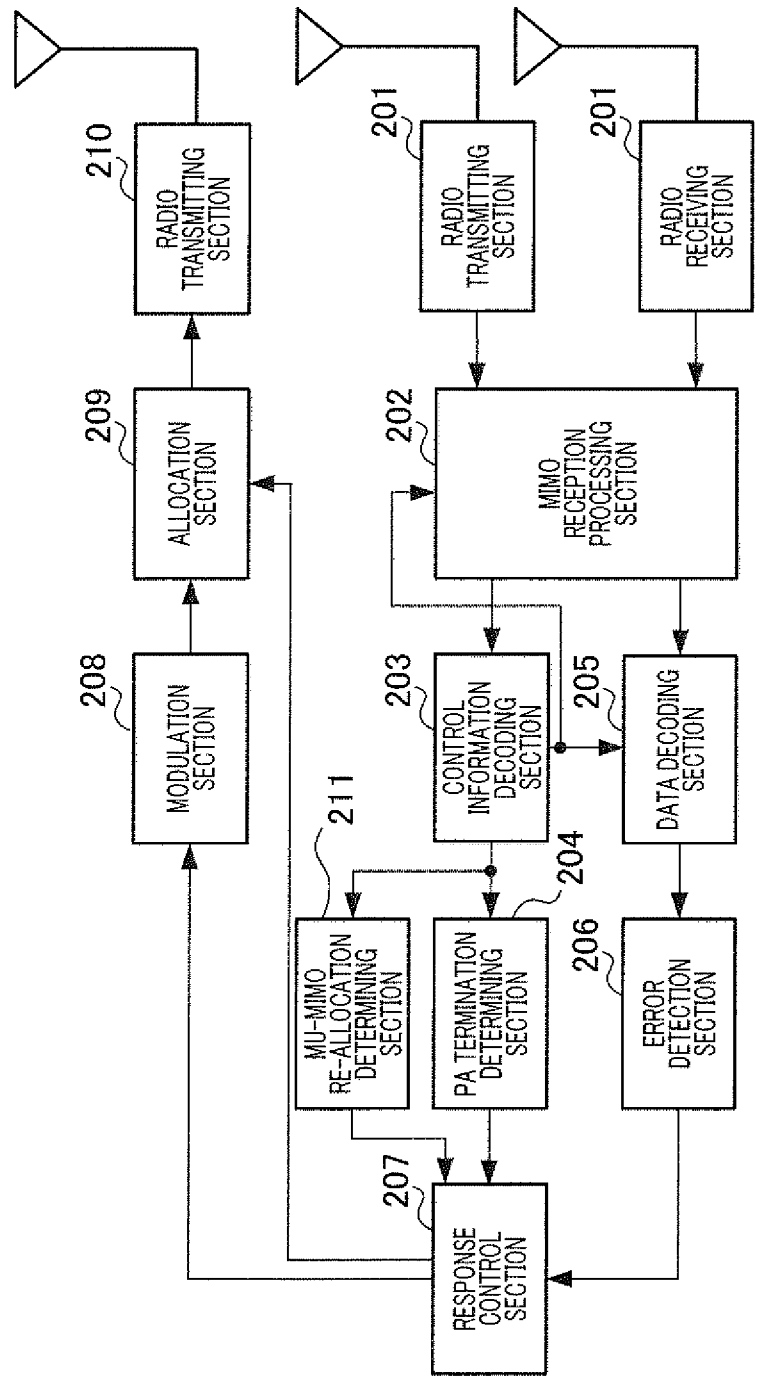
FIG. 15 is a block diagram showing a main part configuration of a terminal according to Embodiment 1 of the present invention.

FIG. 15 is a block diagram showing a main part configuration of terminal 200 according to Embodiment 1 of the present invention. In FIG. 15, terminal 200 includes radio reception section 201, MIMO reception processing section 202, control information decoding section 203, PA termination determination section 204, data decoding section 205, error detection section 206, response control section 207, modulation section 208, allocation section 209, radio transmission section 210 and MU-MIMO re-allocation determination section 211.

Radio reception section 201 receives the signal allocated to the downlink allocation control channel (PA-MAP) transmitted from base station 100 and the downlink data channel (PA#n) through a reception antenna, and performs a reception process such as down conversion, A/D conversion, and a FFT process for the received signal.

MIMO reception processing section 202 demodulates the signal subjected to the radio reception process. MIMO reception processing section 202 performs demodulation processing on the data signal, based on modulation information and MIMO transmission parameters, from control information decoding section 203 (see FIG. 14). When the data signal is MIMO-transmitted, MIMO reception processing section 202 performs MIMO separation processing such as MMSE reception or MLD reception, separates spatial streams addressed to the terminal from the received signal and then performs demodulation processing.

Control information decoding section 203 extracts the downlink allocation control information from the demodulated signal and decodes the downlink allocation control information. To be more specific, control information decoding section 203 de-masks the CRC included in the downlink allocation control information using the ID of the host apparatus. If the CRC result indicates OK, control information decoding section 203 determines that the downlink allocation control information is destined to the host apparatus and outputs the decoded downlink allocation control information destined to the host apparatus to PA determination section 204 and MU-MIMO re-allocation determination section 211. Otherwise, if the CRC result indicates NG, control information decoding section 203 determines that the downlink allocation control information is not destined to the host apparatus and performs nothing.

In addition, control information decoding section 203 outputs information on the resource size and the position of the downlink data resource out of the downlink allocation control information to data decoding section 205.

Data decoding section 205 extracts the downlink data from the demodulated signal based on the information on the resource size and the position of the downlink data resource notified from the control information decoding section 203 and decodes the extracted downlink data.

As described above, radio reception section 201, MIMO reception processing section 202, control information decoding section 203 and data decoding section 205 function as a reception section that receives downlink allocation control information and downlink data addressed to the host apparatus.

PA termination determination section 204 determines whether or not "PA termination" is notified from base station 100, based on the decoded downlink allocation control information. As described above, the downlink allocation control information includes information on the resource size and the position of the downlink data resource and an HF number. PA termination determination section 204 outputs the determination result for "PA termination" to response control section 207. Furthermore, PA termination determination section 204 extracts the HF number from the downlink allocation control information and outputs the HF number to response control section 207.

MU-MIMO re-allocation determination section 211 determines whether or not "MU-MIMO re-allocation" is notified from base station 100 based on the decoded downlink allocation control information. As described above, the downlink allocation control information includes information on the resource size and the position of the downlink data resource and the HF number. MU-MIMO re-allocation determination section 211 outputs the determination result for "MU-MIMO re-allocation" to response control section 207. Furthermore, MU-MIMO re-allocation determination section 211 extracts the HF number from the downlink allocation control information and outputs the HF number to response control section 207. MU-MIMO re-allocation determination section 211 stores the past downlink allocation control information and compares it with the current downlink allocation control information to determine whether or not the "MU-MIMO re-allocation" is notified. That is, when information on the resource size and the position of the past downlink data resource and the HF number is common to information on the resource size and the position of the current downlink data resource and the HF number, MU-MIMO re-allocation determination section 211 determines that "MU-MIMO re-allocation" is notified from base station 100.

As described above, PA termination determination section 204 and MU-MIMO re-allocation determination section 211 function as a determination section that determines the type of downlink allocation control information.

Error detection section 206 detects an error in the decoded downlink data, for example, using CRC and outputs the error detection result to response control section 207.

Response control section 207 controls transmission of the response signal used in the retransmission control of the downlink data and the downlink allocation control information based on the error detection result obtained from error detection section 206 and the determination results obtained from PA termination determination section 204 and MU-MIMO re-allocation determination section 211. To be more specific, response control section 207 stores a reception response rule table and transmits response signals corresponding to the downlink allocation control information and the received downlink data using an uplink response resource including a control response resource and a data response resource specified by the downlink allocation control information, based on the error detection result obtained in error detection section 206, the determination results obtained in PA termination determination section 204 and MU-MIMO re-allocation determination section 211 and the reception response rule table. A method of controlling transmission of the response signal in response control section 207 will be described later. Response control section 207 outputs information of the response resource for allocating the response signal to allocation section 209.

Modulation section 208 modulates the response signal from response control section 207 and outputs the modulated signal to allocation section 209.

Allocation section 209 allocates the modulated response signal to the response resource notified from response control section 207.

Radio transmission section 210 performs a radio transmission process such as an IFFT process, D/A conversion, amplification, and up-conversion for the modulation signal from allocation section 209 and transmits the signal subjected to the radio transmission process through a transmission antenna.

[Operations of Base Station 100 and Terminal 200]

Figure 16:
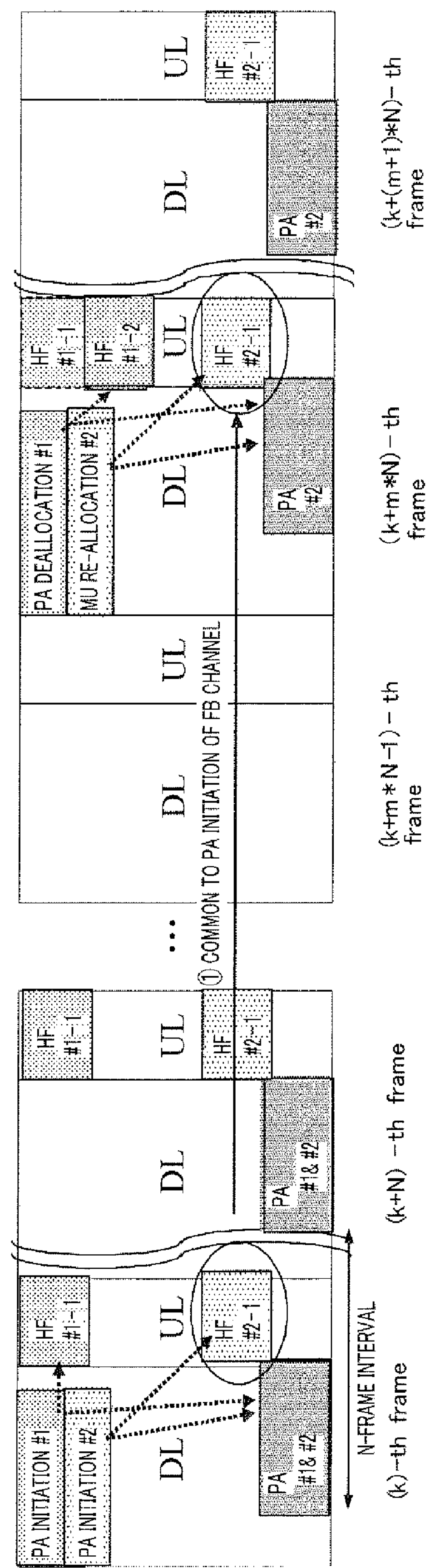
FIG. 16 is a diagram illustrating operation of the base station and terminal.

Operations of base station 100 and terminal 200 having the configurations described above will be described. FIG. 16 is a diagram illustrating operations of base station 100 and terminal 200. A case will be described below where MU-MIMO transmission is performed on two terminal apparatuses, but the present invention is not limited to this.

<Resource Allocation Control by Base Station 100>

Base station 100 notifies a "PA initiation" instruction to a plurality of terminals 200 that perform MU-MIMO transmission in a k-th frame. FIG. 16 shows an example where MU-MIMO is performed on a terminal group made up of two terminals #1 and #2. That is, base station 100 transmits PA initiation #1 for notifying a "PA initiation" instruction to terminal #1 and PA initiation #2 for notifying a "PA initiation" instruction to terminal #2.

Likewise in the k-th frame, base station 100 transmits data signals to terminal #1 and terminal #2 using resources for downlink data transmission allocated by "PA initiation" instructions (PA initiation #1 and PA initiation #2) using spatially multiplexed streams.

Furthermore, in a subsequent frame, base station 100 transmits downlink data to terminal #1 and terminal #2 using the same resource in a frame period (N frames) specified by the "PA initiation" instructions (PA initiation #1 and PA initiation #2). In FIG. 16, resources whose index information are HF#1-1 and HF#2-1 respectively are allocated to terminal #1 and terminal #2 as uplink response resources at the event of "PA initiation."

Furthermore, base station 100 transmits PA-MAP (PA deallocation #1) for notifying the "PA termination" instruction to terminal #1 in a (k+m×N)-th frame. In FIG. 16, a resource whose index information is HF#1-2 is allocated as an uplink response resource for the "PA termination" instruction (PA deallocation #1).

Furthermore, base station 100 transmits PA-MAP (MU re-allocation #2) for notifying an "MU-MIMO re-allocation" instruction to terminal #2 in the (k+m×N)-th frame. Here, the same resource as the uplink response resource for the "PA initiation" instruction is allocated to the uplink response resource corresponding to the "MU-MIMO re-allocation" instruction. In FIG. 16, the same uplink response resource as that for PA initiation #2 is allocated as the uplink response resource corresponding to the "MU-MIMO re-allocation" instruction (MU re-allocation #2).

<Response in Terminal 200>

Error detection section 206 performs error detection for the successfully received downlink data and outputs the error detection result to response control section 207.

In addition, response control section 207 performs transmission control of the response signal based on the type of the downlink allocation control information, success/failure to receive the downlink allocation control information, the error detection result of downlink data and information regarding uplink response resources included in the downlink allocation control information. To be more specific, response control section 207 performs transmission control on a response signal, based on the error detection result received from error detection section 206, the determination result received from PA termination determination section 204, the determination result received from MU-MIMO re-allocation determination section 211 and information regarding the uplink response resource, as follows.

[1] If Determination Result from PA Termination Determination Section 204 Indicates Other than "PA Termination" and Determination Result Received from MU-MIMO Re-Allocation Determination Section 211 Indicates Other than "MU-MIMO Re-Allocation":

Response control section 207 creates the response signal indicating the error detection result of downlink data. In addition, response control section 207 outputs, to allocation section 209, information of the data response resource for allocating the response signal indicating the error detection result of downlink data. For example, response control section 207 outputs, to allocation section 209, information of HFBCH corresponding to the HF number contained in the downlink allocation control information at the event of "PA initiation" as information of the data response resource.

[2] If Determination Result from PA Termination Determination Section 204 Indicates "PA Termination":

Response control section 207 creates, as a response signal, ACK indicating that downlink allocation control information for notifying the "PA termination" instruction is successfully received. In addition, response control section 207 outputs, to allocation section 209, information of the control response resource for allocating ACK.

If the determination result from PA determination section 204 indicates "PA termination," ACK in response to downlink allocation control information is fed back to base station 100 using an uplink resource different from the data response resource to which a response signal corresponding to downlink data is allocated.

[3] If Determination Result from MU-MIMO Re-Allocation Determination Section 211 Indicates "MU-MIMO Re-Allocation":

Response control section 207 generates a response signal based on success/failure to receive the downlink allocation control information, the error detection result of downlink data and the response signal rule table.

Figure 17:
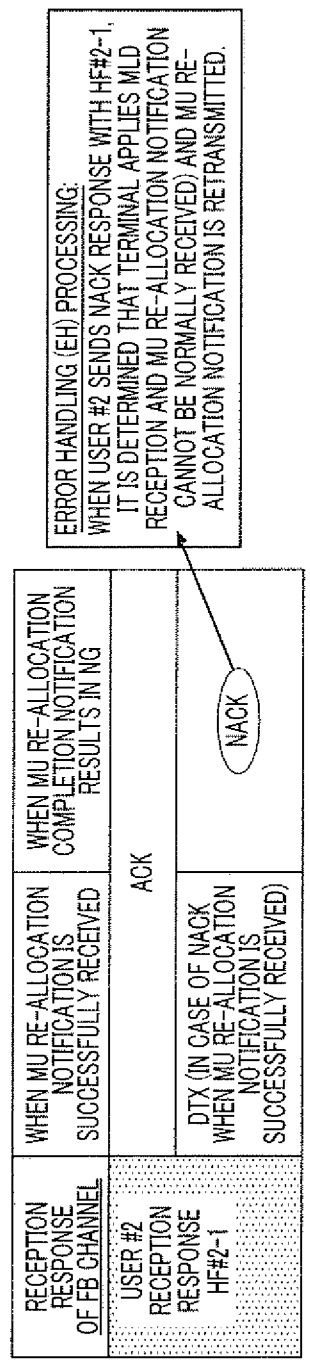
FIG. 17 is a diagram illustrating a reception response rule.

FIG. 17 shows the reception response rule table. In the reception response rule table, success/failure to receive the downlink allocation control information and pattern candidates of the error detection result on downlink data and the type of response signal are associated with each other. To be more specific, the reception response rule table classifies three cases; a first case where no error is detected in downlink data, a second case where the downlink allocation control information is successfully received and an error is detected in the downlink data, and a third case where the downlink allocation control information is not successfully received and an error is detected in downlink data, and different types of response signals are associated with the three cases. To be more specific, ACK is associated with the first case where no error is detected in the downlink data, regardless of success/failure to receive the downlink allocation control information, DTX is associated with the second case and NACK is associated with the third case.

Therefore, response control section 207 generates ACK 1) when no error is detected in the error detection result on the downlink data, and assumes DTX as the response signal, that is, generates no response signal 2) when the downlink allocation control information is successfully received and an error is detected in the downlink data. Then, response control section 207 generates NACK 3) when the downlink allocation control information is not successfully received and an error is detected in the downlink data. Since it is not possible to recognize that terminal 200 fails to receive the downlink allocation control information, the third case actually corresponds to a case where an error is detected in the downlink data at timing at which the downlink allocation control information is not successfully received.

In addition, response control section 207 outputs, to allocation section 209, information of the data response resource for allocating the response signal indicating the error detection result of downlink data.

That is, when the determination result from MU-MIMO re-allocation determination section 211 indicates "MU-MIMO re-allocation," the same uplink resource as that of the data response resource used so far is allocated to the control response resource. For example, response control section 207 outputs information of HFBCH corresponding to the HF number included in the downlink allocation control information at the event of "PA initiation" to allocation section 209 as information of the data response resource.

Therefore, in the example shown in FIG. 16, terminal #2 feeds back ACK/NACK corresponding to the data to base station 100 using the uplink response resource specified by HF#2-1 as a response signal in the (k+m×N)-th frame. When terminal #2 successfully receives downlink allocation control information for notifying the "MU-MIMO re-allocation" instruction in the (k+m×N)-th frame, the response signal to the data is ACK or DTX. On the other hand, when terminal #2 fails to receive the downlink allocation control information for notifying the "MU-MIMO re-allocation" instruction, the response signal to the data is ACK or NACK.

Thus, transmission of a response signal to downlink data is controlled based on the determination result on whether or not "MU-MIMO re-allocation" is instructed.

Here, while there are actually four pattern candidates regarding success/failure to receive the downlink allocation control information and the error detection result on the downlink data, the present embodiment narrows down pattern candidates regarding success/failure to receive the downlink allocation control information and the error detection result on the downlink data to three pattern candidates.

Figure 12:
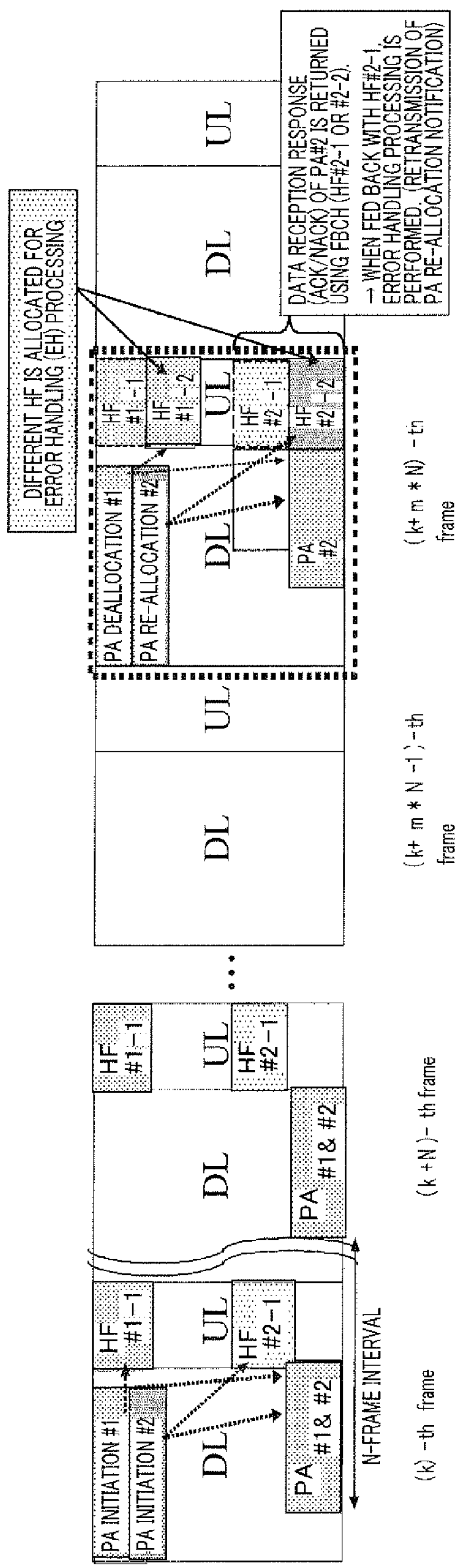
FIG. 12 is a diagram illustrating MU-MIMO transmission using PA.

That is, in consideration of the case in FIG. 12, there are four states in the reception response pattern as shown in FIG. 18; state 1 in which nothing is sent with HF#2-1 and NACK is sent with HF#2-2, state 2 in which nothing is sent in HF#2-1 and ACK is sent with HF#2-2, state 3 in which ACK is transmitted with HF#2-1 and nothing is sent with HF#2-2 and state 4 in which NACK is transmitted with HF#2-1 and nothing is sent with HF#2-2.

Of these four states, the probability corresponding to state 3 is extremely small when terminal 200 performs MLD reception. That is, as described above, terminal 200 is basically not successful in MLD reception without other user modulation information Mp contained in the downlink allocation control information and in case it should be successful, success is limited to an extremely rare case where interference between streams is very small.

Therefore, it is not inconvenient to assume that state 3 is limited to terminal 200 that adopts a reception method that does not require other user modulation information Mp as in the case of MMSE.

Thus, the present embodiment narrows down pattern candidates of success/failure to receive the downlink allocation control information and the error detection result on the downlink data to three pattern candidates by handling the case where the downlink allocation control information is not successfully received and no error is detected in the downlink data just as with the case where the downlink allocation control information is successfully received and no error is detected in the downlink data. This eliminates the need for providing resources for error handling processing on the PA re-allocation notification (resource specified with HF#2-2 in FIG. 12) which would be necessary in the case of FIG. 12. That is, when PA is applied to MU-MIMO, it is possible to prevent the number of resources used for feedback from increasing.

Furthermore, by assuming DTX as a response signal in the case where the downlink allocation control information is successfully received and an error is detected in the downlink data (that is, second case), base station 100 which is the receiving side of the response signal can judge whether the signal is a response signal in the second case or a response signal in other cases based on the presence or absence of the receiving power. That is, base station 100 can more easily determine the response signal and there are no influences of receiving quality deterioration of the response signal. Furthermore, by assuming the response signal in the second case to be DTX (that is, the terminal does not return a response signal), an additional effect of reducing power consumption of the terminal can also be obtained.

<Response by Base Station 100>

Retransmission control section 106 determines, based on the determination result from PA allocation control section 101 and the determination result from ACK/NACK/DTX determination section 105, which of the following states the terminal 200 recognizes; "PA initiation" completed or overlooked, "PA re-allocation" completed or overlooked, "MU-MIMO re-allocation" completed or overlooked, "PA termination" completed or overlooked, and the downlink transmission data successfully received or not successfully received.

[1] When Determination Result from PA Allocation Control Section 101 Indicates "PA Initiation":

ACK/NACK/DTX determination section 105 extracts a response signal transmitted using a data response resource from the demodulated received signal based on the information of the data response resource notified from PA allocation control section 101 and determines which of ACK/NACK/DTX the extracted response signal corresponds to.

When the determination result from ACK/NACK/DTX determination section 105 is ACK, retransmission control section 106 determines that terminal 200 successfully receives the downlink data and notifies this fact to initial transmission/retransmission data creation section 107. In this case, initial transmission/retransmission data creation section 107 outputs initial transmission downlink data to modulation section 109.

If the determination result from ACK/NACK/DTX determination section 105 is NACK, retransmission control section 106 determines that terminal 200 fails to receive the downlink data and notifies this fact to initial transmission/retransmission data creation section 107. In this case, initial transmission/retransmission data creation section 107 outputs the downlink data for retransmission data to modulation section 109.

If the determination result from ACK/NACK/DTX determination section 105 is DTX, retransmission control section 106 determines that terminal 200 fails to receive the downlink allocation control information and notifies this fact to downlink allocation control information creation section 102. In this case, downlink allocation control information creation section 102 outputs, to modulation section 108, information on the period of the downlink data resource for allocating the downlink data channel determined at the event of "PA initiation," the resource size and the position of the downlink data resource, and the ACK/NACK resource (data response resource) for the downlink data.

[2] If Determination Result from PA Allocation Control Section 101 Indicates "PA Re-Allocation":

ACK/NACK/DTX determination section 105 extracts the response signal transmitted using the data response resource from the demodulated received signal based on the information on the data response resource notified from PA allocation control section 101 and determines which of ACK/NACK/DTX each of the extracted response signals corresponds to.

If the determination result for the downlink data from ACK/NACK/DTX determination section 105 is ACK, retransmission control section 106 determines that terminal 200 successfully receives the PA re-allocation instruction and notifies this fact to initial transmission/retransmission data creation section 107. In this case, initial transmission/retransmission data creation section 107 outputs initial transmission downlink data to modulation section 109.

On the other hand, if the determination result for the downlink data from ACK/NACK/DTX determination section 105 is NACK, retransmission control section 106 determines that terminal 200 successfully receives the "PA re-allocation" instruction but fails to receive the downlink data and notifies this fact to initial transmission/retransmission data creation section 107. In this case, initial transmission/retransmission data creation section 107 outputs, to modulation section 109, the downlink data for retransmission data.

If the determination result for the downlink data from ACK/NACK/DTX determination section 105 is DTX, retransmission control section 106 determines that terminal 200 fails to receive (overlooks) the "PA re-allocation" instruction and notifies this fact to initial transmission/retransmission data creation section 107 and downlink allocation control information creation section 102. In this case, initial transmission/retransmission data creation section 107 outputs, to modulation section 109, the downlink data transmitted at the event of "PA re-allocation" as downlink data for retransmission. Downlink allocation control information creation section 102 is outputs the downlink allocation control information transmitted at the event of "PA re-allocation" to modulation section 108.

[3] If Determination Result from PA Allocation Control Section 101 Indicates "PA Termination":

ACK/NACK/DTX determination section 105 extracts the response signal transmitted with the control response resource from the demodulated received signal based on the information of the control response resource notified from PA allocation control section 101 and determines which of ACK/NACK/DTX the extracted response signal corresponds to.

If the determination result from ACK/NACK/DTX determination section 105 is ACK, retransmission control section 106 determines that terminal 200 successfully receives the "PA termination" instruction and notifies this fact to initial transmission/retransmission data creation section 107. In this case, initial transmission/retransmission data creation section 107 terminates transmission of the downlink data.

If the determination result from ACK/NACK/DTX determination section 105 is DTX, retransmission control section 106 determines that terminal 200 fails to receive (overlooks) the "PA termination" instruction and notifies this fact to downlink allocation control information creation section 102.

Downlink allocation control information creation section 102 outputs, to modulation section 108, the downlink allocation control information transmitted at the event of "PA termination."

[4] If Determination Result from PA Allocation Control Section 101 Indicates "MU-MIMO Re-Allocation":

ACK/NACK/DTX determination section 105 extracts the response signal transmitted with the data response resource from the demodulated received signal based on the information of the data response resource notified from PA allocation control section 101 and determines which of ACK/NACK/DTX each of the extracted response signals corresponds to.

If the determination result for the downlink data from ACK/NACK/DTX determination section 105 is ACK, retransmission control section 106 determines that terminal 200 successfully receives the MU-MIMO re-allocation instruction (or this is MMSE reception and need not the MU-MIMO re-allocation instruction) and successfully receives the downlink data, and notifies this fact to initial transmission/retransmission data creation section 107. In this case, initial transmission/retransmission data creation section 107 outputs initial transmission downlink data to modulation section 109.

On the other hand, if the determination result for the downlink data from ACK/NACK/DTX determination section 105 is DTX, retransmission control section 106 determines that terminal 200 successfully receives the MU-MIMO re-allocation instruction but fails to receive the downlink data and notifies this fact to initial transmission/retransmission data creation section 107. In this case, initial transmission/retransmission data creation section 107 outputs downlink data for the retransmission data to modulation section 109.

If the determination result for the downlink data from ACK/NACK/DTX determination section 105 is DTX, retransmission control section 106 determines that terminal 200 fails to receive (overlooks) the "MU-MIMO re-allocation" instruction and notifies this fact to initial transmission/retransmission data creation section 107 and downlink allocation control information creation section 102. In this case, initial transmission/retransmission data creation section 107 outputs, to modulation section 109, the downlink data transmitted at the event of "MU-MIMO re-allocation" as downlink data for retransmission. Downlink allocation control information creation section 102 then outputs the downlink allocation control information transmitted at the event of "MU-MIMO re-allocation" to modulation section 108.

As described above, according to the present embodiment, response control section 207 in terminal 200 transmits the response signal for the downlink allocation control information and the received downlink data using the uplink response resource including the control response resource and the data response resource specified by the downlink allocation control information, based on the type of the downlink allocation control information determined by PA termination determination section 204 and MU-MIMO re-allocation determination section 211, the error detection result obtained from error detection section 206 and the reception response rule table.

In the reception response table used in the reception frame of the downlink allocation control information regarding MU-MIMO re-allocation, response signals of different types are associated with the first case in which no error is detected in the received downlink data of the specified resource specified by the downlink allocation control information received before the downlink allocation control information regarding MU-MIMO re-allocation, the second case in which the downlink allocation control information regarding MU-MIMO re-allocation is successfully received and no error is detected in the received downlink data of the specified resource and the third case in which the downlink allocation control information regarding MU-MIMO re-allocation is not successfully received and an error is detected in the received downlink data of the specified resource.

Furthermore, the resource used for a response signal in the reception frame of the downlink allocation control information regarding MU-MIMO re-allocation is the same resource as the data response resource specified by the downlink allocation control information received before the downlink allocation control information regarding MU-MIMO re-allocation in any one of the above-described first to third cases.

Thus, it is possible to narrow down pattern candidates of success/failure to receive the downlink allocation control information and the error detection result on the downlink data to three pattern candidates by handling the case where the downlink allocation control information is not successfully received and no error is detected in the downlink data just as with the case where the downlink allocation control information is successfully received and no error is detected in the downlink data. As a result, there is no more need for providing resources for error handling processing on the MU-MIMO re-allocation notification, and it is thereby possible to prevent the number of resources used for feedback from increasing.

Furthermore, in the reception response table used in the reception frame of the downlink allocation control information regarding MU-MIMO re-allocation, ACK is associated with the above-described first case, DTX is associated with the second case and NACK is associated with the third case.

Thus, by assuming DTX as the response signal in the second case, base station 100, which is the receiving side of the response signal, can determine whether the signal is a response signal in the second case or a response signal in other cases based on the presence or absence of receiving power. That is, this allows base station 100 to easily determine the response signal.

The above description has focused on the reception response in the reception frame of MU-MIMO re-allocation transmitted when communication of an arbitrary terminal in the terminal group terminates. However, the present invention is not limited to this, and a similar reception response may also be performed in the reception frame of MU-MIMO re-allocation transmitted in the following cases.

Figure 19:
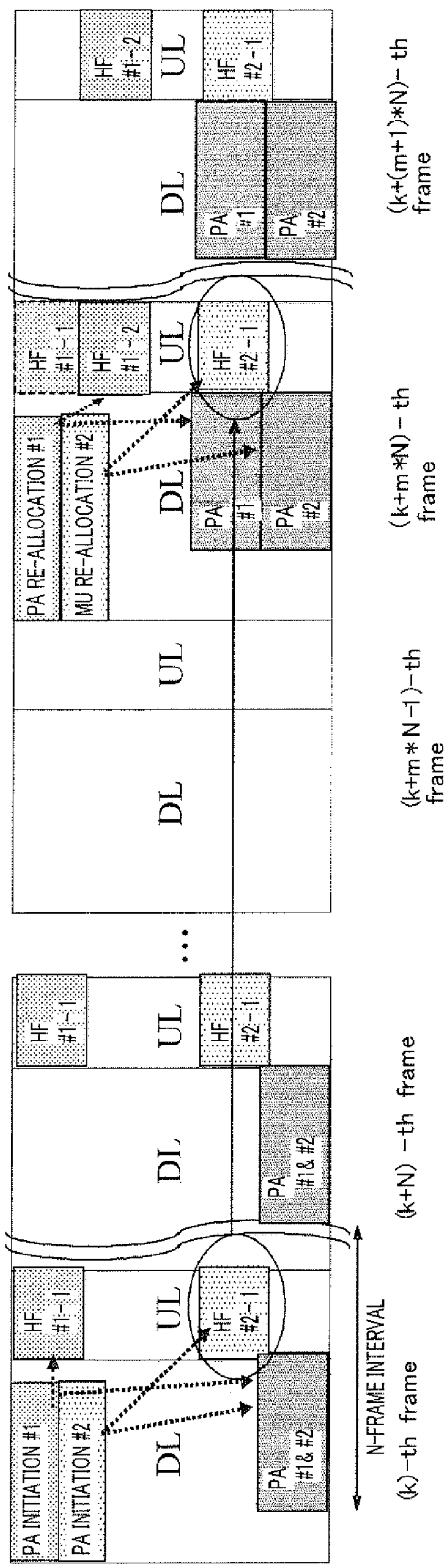
FIG. 19 is a diagram illustrating a variation of a situation in which MU-MIMO re-allocation is transmitted.

[1] MU-MIMO Re-Allocation Transmitted when Arbitrary Terminal in Terminal Group Exits from Terminal Group Through PA Re-Allocation:

In FIG. 19, while PA re-allocation #1 is transmitted to terminal #1 in the (k+m×N)-th frame, MU-MIMO re-allocation #2 is transmitted to terminal #2. With PA re-allocation #1, PA#1 is allocated to terminal #1 as a downlink data resource, and terminal #1 thereby exits from the terminal group allocated to the same downlink resource through MU-MIMO with terminal #2 (that is, through spatial multiplexing). The situation of terminal #2 in this case is the same situation when communication of terminal #1 shown in FIG. 16 terminates. Therefore, terminal 200 can transmit a response signal according to the same reception response rule also in the reception frame of MU-MIMO re-allocation transmitted when an arbitrary terminal in the terminal group exits from the terminal group through PA re-allocation.

Figure 20:
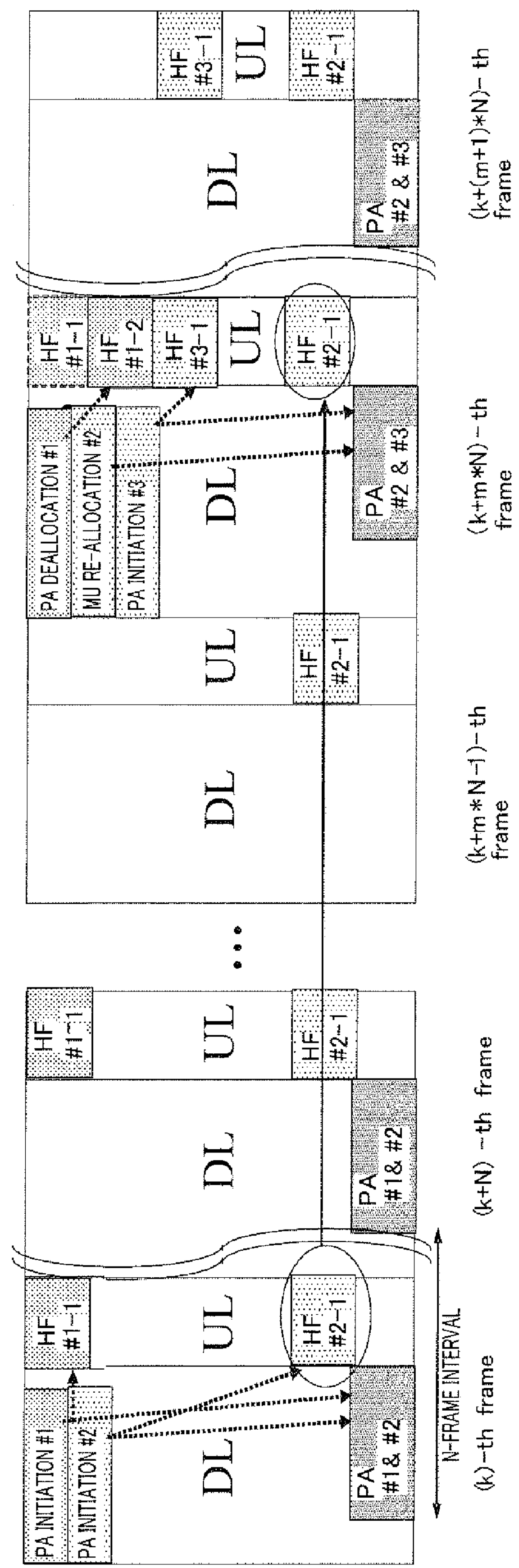
FIG. 20 is a diagram illustrating a variation of a situation in which MU-MIMO re-allocation is transmitted.

[2] MU-MIMO Re-Allocation Transmitted when Arbitrary Terminal Exits from Terminal Group and Other Terminals Join Terminal Group:

In FIG. 20, in the (k+m×N)-th frame, PA deallocation #1 is transmitted to terminal #1, MU-MIMO re-allocation #2 is transmitted to terminal #2 and PA initiation #3 is transmitted to terminal #3. First, communication of terminal #1 is terminated by PA deallocation #1 and terminal #1 thereby exits from the terminal group with terminal #2. At the same time, communication of terminal #3 is initiated by PA initiation #3 and terminal #3 joins the terminal group.

In this case, although there is no change in the number of spatial streams, the modulation scheme of new users allocated to the MU-MIMO resource (that is, users newly joining the terminal group) may be different from that of other members. For this reason, an MU-MIMO re-allocation notification is necessary to prevent deterioration of the reception characteristic due to a replica generation error of the MLD reception user.

Therefore, when the new user uses a modulation scheme different from the modulation scheme of the other members, it is possible to transmit MU-MIMO re-allocation to the other members and the members receiving this can transmit a response signal according to the above-described reception response rule.

In FIG. 20, the factor for exiting from the terminal group is assumed to be a PA termination notification, but the factor is not limited to this and may also be a PA re-allocation notification. Furthermore, in FIG. 20, the factor for joining the terminal group is assumed to be a PA initiation notification, but the factor is not limited to this and may also be a PA re-allocation notification.

A case has been described above where even when an MU-MIMO re-allocation notification and another notification are transmitted in the same frame, they are transmitted individually to each terminal 200. However, the present invention is not limited to this and a collective PA notification for a plurality of users (DL Composite A-MAP IE) may also be used.

FIG. 21 is a diagram illustrating contents of downlink allocation control information when a collective PA notification for a plurality of users disclosed in Non-Patent Literature 3 is used. As shown in FIG. 21, for a PA notification, two types of control information formats are defined; DL Individual Persistent A-MAP_IE notified to terminals individually and DL Composite Persistent A-MAP_IE to notify the PA to a plurality of users collectively. DL Composite Persistent A-MAP_IE further includes one or more items of user-specific PA information. The user-specific PA information is information on the period of the downlink resource to which the downlink data channel is allocated, the position of the downlink resource, the uplink response resource to feed back ACK/NACK (Acknowledgment/Negative Acknowledgment) which is a response signal for the downlink data to the base station and the MIMO-related parameter information shown in FIG. 2. When this collective PA notification for a plurality of users is used, terminal 200 can detect not only the PA allocation information of the user of the terminal but also the PA allocation information of the other users belonging to the same terminal group.

Figure 22:
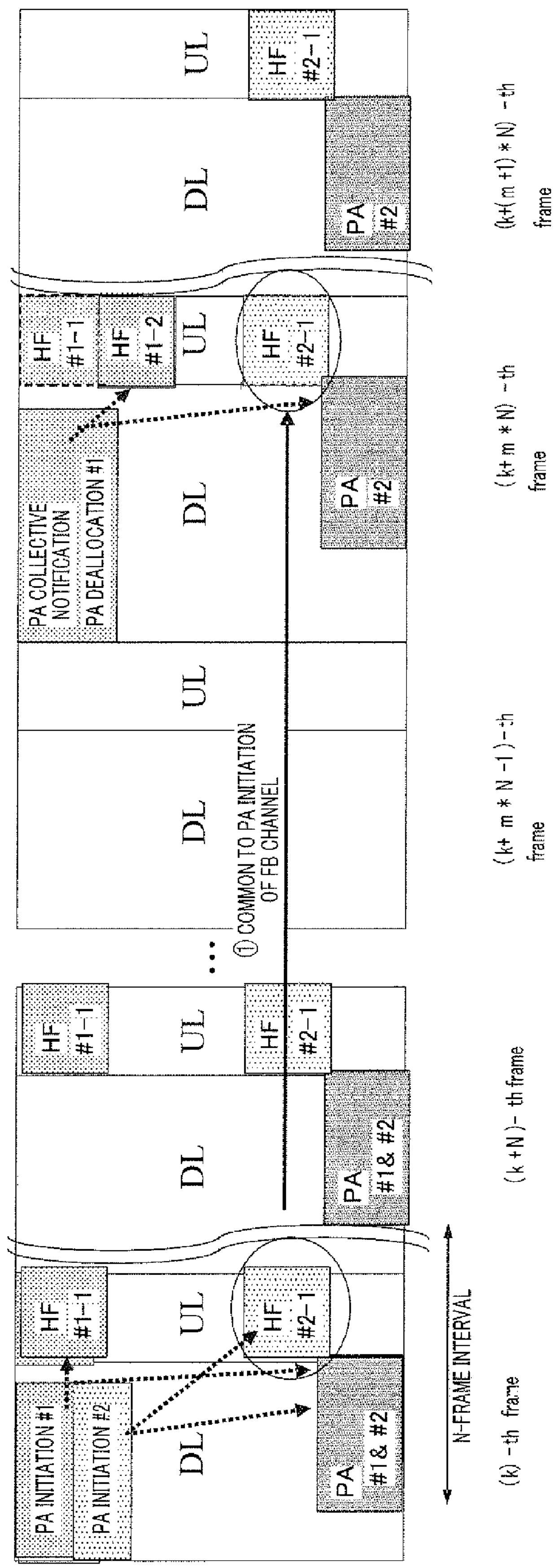
FIG. 22 is a diagram illustrating a reception response rule.

Thus, as shown in FIG. 22, when PA termination is notified to user #1 using collective PA notification for a plurality of users (DL Composite A-MAP IE) (in FIG. 22, PA collective notification: PA deallocation #1), user #2 that continues MU-MIMO can detect PA deallocation notification #1 of user #1. This allows user #2 to detect a reduction in the number of streams of MU-MIMO communication and thereby eliminate the need for transmitting a MU-MIMO re-allocation notification. This makes it possible to reduce overhead of control information. However, even when the MU-MIMO re-allocation notification is made unnecessary, terminal 200 needs to cause base station 100 to recognize whether or not a variation in the number of streams has been detected correctly through a collective PA notification for a plurality of users for error handling processing, and therefore transmits a response signal. The above-described reception response rule can be used as the transmission rule for this response signal.

Embodiment 2

In Embodiment 1, ACK, NACK and DTX are associated with response signals in the above-described three cases respectively. By contrast, in Embodiment 2, different symbols are associated with response signals in the three cases respectively. That is, in Embodiment 2, in the above-described second case, the response signal is not DTX, and NACK2 is transmitted with a symbol different from NACK in the third case as the response signal.

[Configuration and Operation of Terminal 200A]

Figure 23:
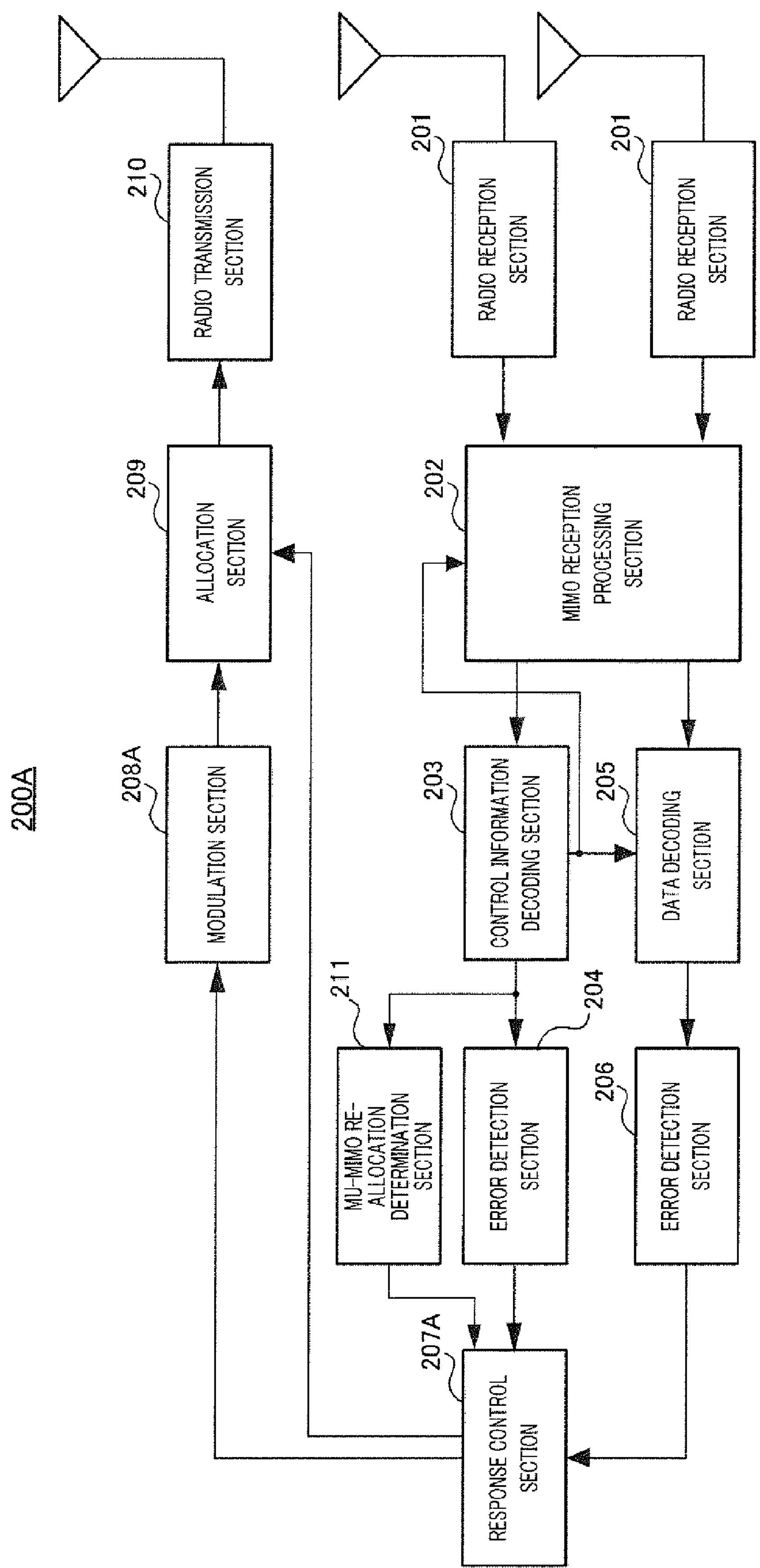
FIG. 23 is a block diagram illustrating a main part configuration of a terminal according to Embodiment 2 of the present invention.

FIG. 23 is a block diagram showing a configuration of terminal 200A according to Embodiment 2. In FIG. 23, terminal 200A includes response control section 207A and modulation section 208A.

Modulation section 208A modulates a response signal from response control section 207A and outputs the modulated signal to allocation section 209. When a symbol mapping method for a NACK2 signal is specified from response control section 207A, modulation section 208A transmits the signal with symbol mapping different from that of the NACK Response control section 207A performs transmission control on the response signal based on the type of downlink allocation control information, success/failure to receive the downlink allocation control information, error detection result on the downlink data and information on the uplink response resource included in the downlink allocation control information. To be more specific, response control section 207A performs transmission control on the response signal based on the error detection result received from error detection section 206, the determination result received from PA termination determination section 204, the determination result received from MU-MIMO re-allocation determination section 211 and information on the uplink response resource as follows.

[1] If Determination Result from PA Termination Determination Section 204 Indicates Other than "PA Termination" and Determination Result Received from MU-MIMO Re-Allocation Determination Section 211 Indicates Other than "MU-MIMO Re-Allocation":

Response control section 207A generates a response signal indicating an error detection result on downlink data.

Furthermore, response control section 207A outputs, to allocation section 209, information of a data response resource to which the response signal indicating the error detection result on the downlink data is allocated. For example, response control section 207A outputs, to allocation section 209, information of HFBCH corresponding to the HF number included in the downlink allocation control information at the event of "PA initiation" as information of the data response resource.

[2] If Determination Result from PA Termination Determination Section 204 Indicates "PA Termination":

Response control section 207A generates ACK indicating that downlink allocation control information for notifying the "PA termination" instruction is successfully received as a response signal. Furthermore, response control section 207A outputs, to allocation section 209, information of a control response resource to which ACK is allocated.

If the determination result from PA termination determination section 204 indicates "PA termination," for ACK corresponding to the downlink allocation control information, an uplink resource different from the data response resource to which a response signal for the downlink data is allocated is used and fed back to base station 100.

[3] If Determination Result from MU-MIMO Re-Allocation Determination Section Indicates "MU-MIMO Re-Allocation":

Response control section 207A generates a response signal based on success/failure to receive the downlink allocation control information, the error detection result on the downlink data and a response signal rule table.

Figure 24:
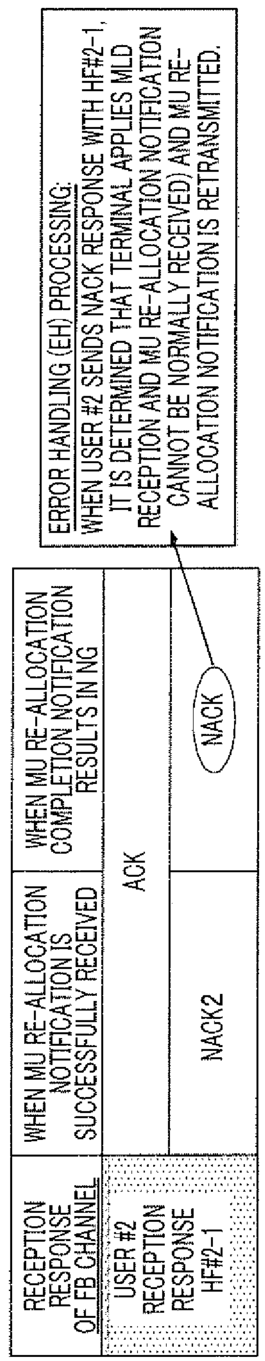
FIG. 24 is a diagram illustrating a reception response rule.

FIG. 24 shows the reception response rule table. FIG. 24 is described in the same format as that in FIG. 17. In the reception response rule table, pattern candidates of success/failure to receive the downlink allocation control information and the error detection result on the downlink data and the type of a response signal are associated with each other. To be more specific, the reception response rule table classifies three cases; a first case where no error is detected in the downlink data, a second case where the downlink allocation control information is successfully received and an error is detected in the downlink data, and a third case where the downlink allocation control information is not successfully received and an error is detected in the downlink data, and response signals of different types are associated with the three cases respectively. To be more specific, ACK is associated with the first case where no error is detected in the downlink data regardless of success/failure to receive the downlink allocation control information, NACK2 is associated with the second case and NACK is associated with the third case.

Figure 25:
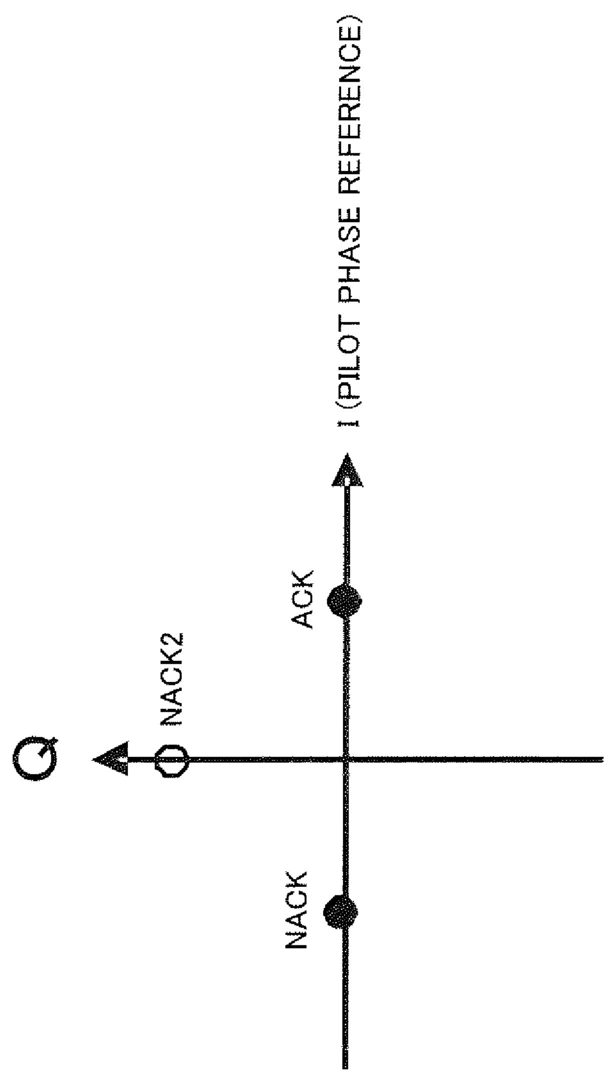
FIG. 25 is a diagram illustrating a reception response rule.

Therefore, response control section 207A generates ACK 1) when no error is detected in the error detection result on the downlink data, and generates NACK2 2) when the downlink allocation control information is successfully received and an error is detected in the downlink data. Then, response control section 207A generates NACK 3) when the downlink allocation control information is not successfully received and an error is detected in the downlink data. Different symbols are associated with ACK, NACK and NACK2 on a constellation as shown in FIG. 25.

That is, in the case where ACK/NACK signal is expressed using BPSK, response control section 207A expresses a NACK2 signal using a constellation resulting from rotating the phase by 90 degrees with reference to a pilot signal (e.g., rotating the phase by 90 degrees [transmitted in QPSK]).

Furthermore, response control section 207A outputs, to allocation section 209, information on the data response resource to which a response signal indicating an error detection result on the downlink data is allocated.

That is, if the determination result from MU-MIMO re-allocation determination section 211 indicates "MU-MIMO re-allocation," the same uplink resource as the data response resource used so far is allocated to the control response resource. For example, response control section 207A outputs, to allocation section 209, information of HFBCH corresponding to the HF number included in the downlink allocation control information at the event of "PA initiation" as information of the data response resource.

Therefore, in the example shown in FIG. 16, terminal #2 feeds back ACK/NACK for the data to base station 100A as a response signal in the (k+m×N)-th frame using the uplink response resource specified with HF#2-1. When terminal #2 successfully receives the downlink allocation control information for notifying the "MU-MIMO re-allocation" instruction in the (k+m×N)-th frame, the response signal for the data is ACK or NACK2. On the other hand, when terminal #2 fails to receive the downlink allocation control information for notifying the "MU-MIMO re-allocation" instruction, the response signal for the data is ACK or NACK.

Thus, transmission of a response signal for the downlink data is controlled based on the determination result on the "MU-MIMO re-allocation" instruction.

[Configuration and Operation of Base Station 100A]

Figure 26:
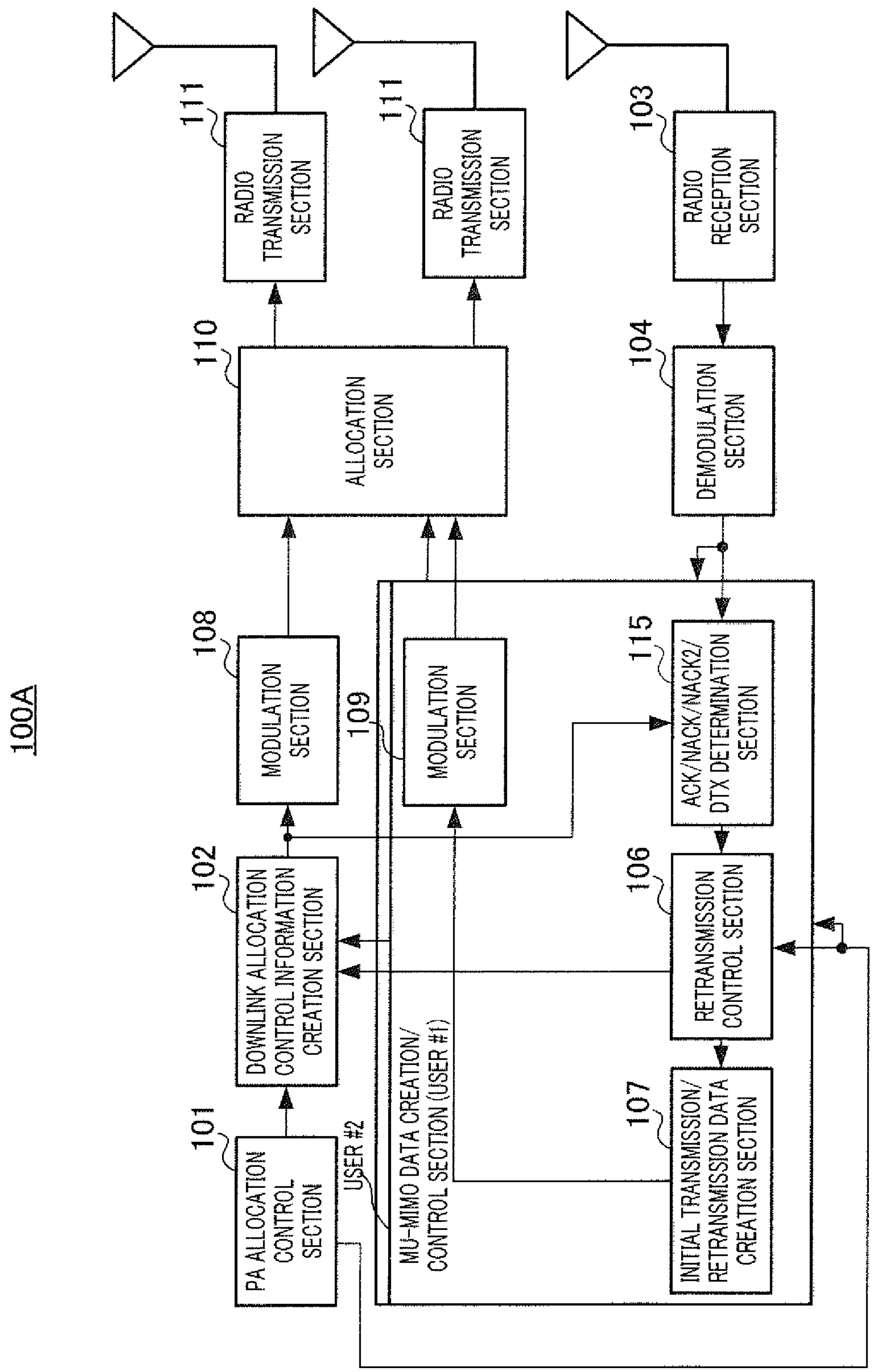
FIG. 26 is a block diagram showing a main part configuration of a base station according to Embodiment 2 of the present invention.

FIG. 26 is a block diagram showing a configuration of base station 100A according to Embodiment 2. In FIG. 26, base station 100A includes ACK/NACK/NACK2/DTX determination section 115.

ACK/NACK/NACK2/DTX determination section 115 extracts a response signal transmitted using an uplink response resource from a demodulated received signal, based on information of an uplink response resource notified from downlink allocation control information creation section 102. ACK/NACK/NACK2/DTX determination section 115 then determines which of ACK/NACK/NACK2/DTX the extracted response signal corresponds to.

Retransmission control section 106 determines, based on the determination result from PA allocation control section 101 and the determination result from ACK/NACK/NACK2/DTX determination section 115, which of the following states terminal 200A recognizes; "PA initiation" completed or overlooked, "PA re-allocation" completed or overlooked, "MU-MIMO re-allocation" completed or overlooked, "PA termination" completed or overlooked, and the downlink transmission data successfully received or not successfully received.

[1] If Determination Result from PA Allocation Control Section 101 Indicates "PA Initiation":

ACK/NACK/NACK2/DTX determination section 115 extracts a response signal transmitted using a data response resource from a demodulated received signal based on the information of the data response resource notified from PA allocation control section 101 and determines which of ACK/NACK/DTX the extracted response signal corresponds to.

If the determination result from ACK/NACK/NACK2/DTX determination section 115 is ACK, retransmission control section 106 determines that terminal 200A successfully receives downlink data and notifies this fact to initial transmission/retransmission data creation section 107. In this case, initial transmission/retransmission data creation section 107 outputs initial transmission downlink data to modulation section 109.

If the determination result from ACK/NACK/NACK2/DTX determination section 115 is NACK, retransmission control section 106 determines that terminal 200A fails to receive downlink data and notifies this fact to initial transmission/retransmission data creation section 107. In this case, initial transmission/retransmission data creation section 107 outputs downlink data for retransmission data to modulation section 109.

If the determination result from ACK/NACK/NACK2/DTX determination section 115 is DTX, retransmission control section 106 determines that terminal 200A fails to receive downlink allocation control information and notifies this fact to downlink allocation control information creation section 102. In this case, downlink allocation control information creation section 102 outputs, to modulation section 108, information on the period of the downlink data resource for allocating the downlink data channel determined at the event of "PA initiation," the resource size and the position of the downlink data resource, and the ACK/NACK resource (data response resource) for the downlink data.

[2] If Determination Result from PA Allocation Control Section 101 Indicates "PA Re-Allocation":

ACK/NACK/NACK2/DTX determination section 115 extracts the response signal transmitted using the data response resource from the received signal subjected to modulation and determines, based on information on the data response resource notified from PA allocation control section 101, which of ACK/NACK/DTX each of the extracted response signals corresponds to.

If the determination result for the downlink data from ACK/NACK/NACK2/DTX determination section 115 is ACK, retransmission control section 106 determines that terminal 200A successfully receives the PA re-allocation instruction and notifies this fact to initial transmission/retransmission data creation section 107. In this case, initial transmission/retransmission data creation section 107 outputs initial transmission downlink data to modulation section 109.

Furthermore, if the determination result for the downlink data from ACK/NACK/NACK2/DTX determination section 115 is NACK, retransmission control section 106 determines that terminal 200A successfully receives the PA re-allocation instruction but fails to receive the downlink data and notifies this fact to initial transmission/retransmission data creation section 107. In this case, initial transmission/retransmission data creation section 107 outputs downlink data for retransmission data to modulation section 109.

If the determination result for the downlink data from ACK/NACK/NACK2/DTX determination section 115 is DTX, retransmission control section 106 determines that terminal 200A fails to receive (overlooks) the "PA re-allocation" instruction and notifies this fact to initial transmission/retransmission data creation section 107 and downlink allocation control information creation section 102. In this case, initial transmission/retransmission data creation section 107 outputs, to modulation section 109, downlink data transmitted at the event of "PA re-allocation" as downlink data for retransmission. Downlink allocation control information creation section 102 outputs, to modulation section 108, the downlink allocation control information transmitted at the event of "PA re-allocation."

[3] If Determination Result from PA Allocation Control Section 101 Indicates "PA Termination":

ACK/NACK/NACK2/DTX determination section 115 extracts the response signal transmitted using the control response resource from the received signal subjected to demodulation and determines, based on the information of the control response resource notified from PA allocation control section 101, which of ACK/NACK/DTX the extracted response signal corresponds to.

If the determination result from ACK/NACK/NACK2/DTX determination section 115 is ACK, retransmission control section 106 determines that terminal 200A successfully receives the "PA termination" instruction and notifies this fact to initial transmission/retransmission data creation section 107. In this case, initial transmission/retransmission data creation section 107 terminates transmission of the downlink data.

If the determination result from ACK/NACK/NACK2/DTX determination section 115 is DTX, retransmission control section 106 determines that terminal 200A fails to receive (overlooks) the "PA termination" instruction and notifies this fact to downlink allocation control information creation section 102. Downlink allocation control information creation section 102 outputs, to modulation section 108, the downlink allocation control information transmitted at the event of "PA termination."

[4] If Determination Result from PA Allocation Control Section 101 Indicates "MU-MIMO Re-Allocation":

ACK/NACK/NACK2/DTX determination section 115 extracts the response signal transmitted using the data response resource from the received signal subjected to demodulation and determines, based on the information of the data response resource notified from PA allocation control section 101, which of ACK/NACK/NACK2 each of the extracted response signals corresponds to.

If the determination result for the downlink data from ACK/NACK/NACK2/DTX determination section 115 is ACK, retransmission control section 106 determines that terminal 200 successfully receives an MU-MIMO re-allocation instruction (or the MU-MIMO re-allocation instruction is unnecessary because terminal 200A performs MMSE reception) and successfully receives the downlink data, and notifies this fact to initial transmission/retransmission data creation section 107. In this case, initial transmission/retransmission data creation section 107 outputs initial transmission downlink data to modulation section 109.

If the determination result for the downlink data from ACK/NACK/NACK2/DTX determination section 115 is NACK2, retransmission control section 106 determines that terminal 200A successfully receives the MU-MIMO re-allocation instruction but fails to receive the downlink data and notifies this fact to initial transmission/retransmission data creation section 107. In this case, initial transmission/retransmission data creation section 107 outputs the downlink data for retransmission data to modulation section 109.

If the determination result for the downlink data from ACK/NACK/NACK2/DTX determination section 115 is NACK, retransmission control section 106 determines that terminal 200A fails to receive (overlooks) data of the "MU-MIMO re-allocation" instruction and notifies this fact to initial transmission/retransmission data creation section 107 and downlink allocation control information creation section 102. In this case, initial transmission/retransmission data creation section 107 outputs, to modulation section 109, the downlink data transmitted at the event of "MU-MIMO re-allocation" as downlink data for retransmission. Downlink allocation control information creation section 102 then outputs, to modulation section 108, the downlink allocation control information transmitted at the event of "MU-MIMO re-allocation."

Using the above-described method, it is also possible to associate different response signals with the above-described three cases respectively. Thus, it is possible to make the resource used for a response signal in the reception frame of the downlink allocation control information regarding MU-MIMO re-allocation the same resource as the data response resource specified by the downlink allocation control information received before the downlink allocation control information regarding MU-MIMO re-allocation in any one of the above-described first to third cases.

An example has been shown above where a NACK signal is made to differ from the NACK2 signal by using, for the NACK2 signal, a symbol resulting from giving a predetermined phase rotation to symbol mapping of the NACK signal. That is, when an ACK/NACK signal is expressed using BPSK, the NACK2 signal is expressed using a constellation resulting from rotating the phase by 90 degrees with reference to a pilot signal.

However, the present invention is not limited to this, and ACK, NACK and NACK2 may also be transmitted as an orthogonal sequence mapped to a plurality of OFDM symbols.

For example, when a response signal is transmitted as an orthogonal sequence using four OFDM symbols, the following mutually orthogonal sequences are allocated to ACK, NACK and NACK2 respectively.

Example 1) ACK: [+1,+1,+1,+1], NACK[+1], NACK2[+1,+1,−1,−1]

Example 2) ACK: [+1,+1,−1,−1], NACK[+1,−1,−1,+1], NACK2[+1,+1,+1,+1]

Here, +1 and −1 are each mapped as BPSK symbols and transmitted.

Thus, base station 100A can separate and distinguish ACK, NACK and NACK2 taking advantage of the fact that ACK, NACK and NACK2 are sequences orthogonal to each other.

Other Embodiments (1) When the capability of the terminal is known to the base station, that is, when the reception method of the terminal is known, the following system operation is also possible. That is, the reception method of the terminal is known using the capability information of the terminal, the base station may notify MU-MIMO re-allocation only to an MLD reception terminal.

(2) Although an antenna has been described in the aforementioned embodiments, the present invention may be similarly applied to an antenna port. The antenna port refers to a logical antenna including a single or a plurality of physical antenna(s). That is, the antenna port is not limited to a single physical antenna, but may refer to an array antenna including a plurality of antennas. For example, in 3 GPP LTE, how many physical antennas are included in the antenna port is not specified, but the minimum unit allowing the base station to transmit different reference signals is specified. In addition, the antenna port may be specified as a minimum unit for multiplying a weight of the pre-coding vector.

(3) Also, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. “LSI” is adopted here but this may also be referred to as “IC,” “system LSI,” “super LSI,” or “ultra LSI” depending on differing extents of integration.

Further, the method of circuit integration is not limited to LSI’s, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI’s as a result of the advancement of semiconductor technology or a derivative other technology, it is naturally also possible to carry out function block integration using this technology. Application of biotechnology is also possible.

The disclosure of Japanese Patent Application No. 2009-198473, filed on Aug. 28, 2009, including the specification, drawings and abstract is incorporated herein by reference in its entirety.

INDUSTRIAL APPLICABILITY

The radio communication apparatus and response control method according to the present invention are suitable for use in preventing, when PA is applied to MU-MIMO, the number of resource used for feedback from increasing.

REFERENCE SIGNS LIST

100 Base station
101 PA allocation control section
102 Downlink allocation control information creation section
103, 201 Radio reception section
104 Demodulation section
105 ACK/NACK/DTX determination section
106 Retransmission control section
107 Initial transmission/retransmission data creation section
108, 109, 208 Modulation section
110, 209 Allocation section
111, 210 Radio transmission section
115 ACK/NACK/NACK2/DTX determination section
200 Terminal
202 MIMO reception processing section
203 Control information decoding section
204 PA termination determination section
205 Data decoding section
206 Error detection section
207 Response control section
211 MU-MIMO re-allocation determination section

The invention claimed is:

1. A radio communication apparatus that receives downlink data addressed to the radio communication apparatus transmitted in a multiuser MIMO communication for simultaneously transmitting a plurality of transmission data to a group including a plurality of radio communication apparatuses, the radio communication apparatus comprising:

a reception section that receives downlink allocation control information and the downlink data addressed to the radio communication apparatus and used for the multiuser MIMO communication;

a determining section that determines a type of the received downlink allocation control information;

an error detection section that detects a reception error of the received downlink data; and a response control section that transmits response signals corresponding to the downlink allocation control information and the received downlink data on uplink response resources including a control information response resource and a received data response resource specified by the downlink allocation control information, based on the determined type, a detection result of the reception error and a reception response rule.

2. The radio communication apparatus according to claim 1, wherein the reception response rule used in a reception frame of downlink allocation control information regarding re-allocation comprises:

a first case where no error is detected in the received downlink data on a specified resource being specified by downlink allocation control information received before the downlink allocation control information regarding the re-allocation;

a second case where the downlink allocation control information regarding the re-allocation is successfully received and no error is detected in the received downlink data on the specified resource; and a third case where the downlink allocation control information regarding the re-allocation is not successfully received and an error is detected in the received downlink data on the specified resource, wherein the response control section associates different types of response signals of with the first to third cases respectively.

3. The radio communication apparatus according to claim 2, wherein a resource used for the response signals in the reception frame of the downlink allocation control information regarding the re-allocation is the same resource as a data response resource specified by the downlink allocation control information received before the downlink allocation control information regarding the re-allocation in any one of the first to third cases.

4. The radio communication apparatus according to claim 2, wherein according to the reception response rule used in the reception frame of the downlink allocation control information regarding the re-allocation, an ACK is associated with the first case, a DTX is associated with the second case and a NACK is associated with the third case.

5. The radio communication apparatus according to claim 2, wherein according to the reception response rule used in the reception frame of the downlink allocation control information regarding the re-allocation, different symbols are associated with the response signals in the first to third cases respectively.

6. The radio communication apparatus according to claim 2, wherein the downlink allocation control information regarding the re-allocation is transmitted from a base station apparatus, when an arbitrary radio communication apparatus in the group exits from the group or when the arbitrary radio communication apparatus exits from the group and another radio communication apparatus joins the group instead of the arbitrary radio communication apparatus.

7. A response control method performed by a radio communication apparatus, the method comprising:

receiving downlink data addressed to the radio communication apparatus transmitted in a multiuser MIMO communication for simultaneously transmitting a plurality of transmission data to a group including a plurality of radio communication apparatuses, using a downlink data resource specified by downlink allocation control information addressed to the radio communication apparatus transmitted in the multiuser MIMO communication;

determining a type of the received downlink allocation control information;

detecting a reception error of the received downlink data; and transmitting response signals corresponding to the downlink allocation control information and the received downlink data on uplink response resources including a control information response resource and a received data response resource specified by the downlink allocation control information, based on the determined type, a detection result of the reception error and a reception response rule.

8. The response control method according to claim 7, wherein the reception response rule used in a reception frame of downlink allocation control information regarding re-allocation comprises:

a first case where no error is detected in the received downlink data on a specified resource being specified by downlink allocation control information received before the downlink allocation control information regarding the re-allocation;

a second case where the downlink allocation control information regarding the re-allocation is successfully received and no error is detected in the received downlink data on the specified resource; and a third case where the downlink allocation control information regarding the re-allocation is not successfully received and an error is detected in the received downlink data on the specified resource, and different response signals are generated for the first to third cases respectively.

9. The response control method according to claim 8, wherein a resource used for the generated response signals in the reception frame of the downlink allocation control information regarding the re-allocation is the same resource as the data response resource specified by the downlink allocation control information received before the downlink allocation control information regarding the re-allocation in any one of the first to third cases.

10. The response control method according to claim 8, wherein an ACK is transmitted in the first case, no response signal is transmitted in the second case and a NACK is transmitted in the third case.

11. The response control method according to claim 8, wherein the response signals in the first to third cases are generated by mapping the response signals to mutually different symbols.

12. The response control method according to claim 8, wherein the downlink allocation control information regarding the re-allocation is transmitted from a base station apparatus, when an arbitrary radio communication apparatus in the group exits from the group or when the arbitrary radio communication apparatus exits from the group and another radio communication apparatus joins the group instead of the arbitrary radio communication apparatus.

* * * * *